United States Patent
Wang et al.

(10) Patent No.: US 11,411,848 B2
(45) Date of Patent: Aug. 9, 2022

(54) FLEXIBLE ETHERNET LATENCY MEASUREMENT METHOD AND RELATED DEVICE

(71) Applicant: HUAWEI TECHNOLOGIES CO., LTD., Guangdong (CN)

(72) Inventors: Renlei Wang, Shenzhen (CN); Xiaojun Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 74 days.

(21) Appl. No.: 16/908,912

(22) Filed: Jun. 23, 2020

(65) Prior Publication Data
US 2020/0322246 A1    Oct. 8, 2020

Related U.S. Application Data

(63) Continuation of application No. PCT/CN2018/122689, filed on Dec. 21, 2018.

(30) Foreign Application Priority Data

Dec. 29, 2017 (CN) .......................... 201711498104.X

(51) Int. Cl.
*H04L 43/0852* (2022.01)
*H04L 5/00* (2006.01)
*H04L 43/10* (2022.01)

(52) U.S. Cl.
CPC ........ *H04L 43/0858* (2013.01); *H04L 5/0051* (2013.01); *H04L 5/0053* (2013.01); *H04L 43/10* (2013.01)

(58) Field of Classification Search
CPC . H04L 43/0858; H04L 5/0051; H04L 5/0053; H04L 43/10
See application file for complete search history.

(56) References Cited

U.S. PATENT DOCUMENTS

2008/0075121 A1    3/2008 Fourcand
2010/0228872 A1    9/2010 Diab et al.
(Continued)

FOREIGN PATENT DOCUMENTS

CN    101854240 A    10/2010
CN    101257361 B    5/2011
(Continued)

OTHER PUBLICATIONS

Extended (Supplementary) European Search Report dated Jan. 13, 2021, issued in counterpart EP Application No. 18897251.7. (9 pages).
(Continued)

*Primary Examiner* — Jackie Zuniga Abad
(74) *Attorney, Agent, or Firm* — WHDA, LLP

(57) ABSTRACT

Embodiments of the present invention provide a flexible Ethernet latency measurement method and a related device. The method includes: determining, by a first node, first duration based on a first downlink transmission time interval and a second downlink receiving time interval; determining, by the first node, second duration based on a first uplink transmission time interval and a second uplink receiving time interval; and calculating, by the first node, an uplink and downlink latency difference between the first node and the second node based on the first duration and the second duration. According to the embodiments of the present invention, costs for measuring an asymmetric uplink and downlink latency can be reduced.

12 Claims, 7 Drawing Sheets

S301: A first node determines first duration based on a first downlink transmission time interval and a second downlink receiving time interval S302: The first node determines second duration based on a first uplink transmission time interval and a second uplink receiving time interval S303: The first node calculates an uplink and downlink latency difference between the first node and the second node based on the first duration and the second duration

(56) References Cited

U.S. PATENT DOCUMENTS

| | | | |
|---|---|---|---|
| 2014/0092918 A1 | 4/2014 | Jost | |
| 2015/0350046 A1 | 12/2015 | Thapliya et al. | |
| 2016/0352500 A1 | 12/2016 | Benjamini et al. | |
| 2017/0093757 A1* | 3/2017 | Gareau | H04L 43/0864 |
| 2018/0248797 A1* | 8/2018 | Kim | H04L 12/42 |

FOREIGN PATENT DOCUMENTS

| | | | |
|---|---|---|---|
| CN | 102111380 A | | 6/2011 |
| CN | 102891747 A | | 1/2013 |
| CN | 102932083 A | | 2/2013 |
| CN | 103857029 A | * | 6/2014 |
| CN | 103857029 A | | 6/2014 |
| CN | 106921456 A | | 7/2017 |
| EP | 3113502 A1 | | 1/2017 |
| JP | H02189046 A | | 7/1990 |
| JP | 2002176441 A | | 6/2002 |
| JP | 2009010761 A | | 1/2009 |
| KR | 20130133314 A | | 12/2013 |

OTHER PUBLICATIONS

Office Action dated Jul. 6, 2021, issued in counterpart JP application No. 2020-536262, with English translation. (6 pages).

Lee, Byoung-Yun et al., "Simple Synchronizer to Enhance Time Accuracy for Legacy Ethernet Applications", 2009 International SoC Design Conference (ISOCC), pp. 504-507.

IEEE 802.3-2015_Section 1-6, "IEEE Standard for Ethernet", IEEE Std 802.3-2015 (Revision of IEEE Std 802.3-2012), Sep. 3, 2015.

IA OIF-FLEXE-01.0, "Flex Ethernet Implementation Agreement", Mar. 2016. (31 pages).

IEEE P802.3bs/D3.0, "Draft Standard for Ethernet-Amendment : Media Access Control Parameters, Physical Layers and Management Parameters for 200 GB/s and 400 GB/s Operation", IEEE Computer Society, Jan. 10, 2017. (387 pages).

International Search Report dated Mar. 20, 2019, issued in counterpart Application No. PCT/CN2018/122689, with English Translation. (12 pages).

Office Action dated Nov. 18, 2021, issued in counterpart CN application No. 201711498104.X, with English translation. (18 pages).

\* cited by examiner

FLEXIBLE ETHERNET LATENCY MEASUREMENT METHOD AND RELATED DEVICE

CROSS-REFERENCE TO RELATED APPLICATIONS

This application is a continuation of International Application No. PCT/CN2018/122689, filed on Dec. 21, 2018, which claims priority to Chinese Patent Application No. 201711498104.X, filed on Dec. 29, 2017. The disclosures of the aforementioned applications are hereby incorporated by reference in their entireties.

TECHNICAL FIELD

The present invention relates to the field of communications technologies, and in particular, to a flexible Ethernet latency measurement method and a related device.

BACKGROUND

A flexible Ethernet (FlexE) can support functions such as binding, a sub-rate, and channelization directed to an Ethernet service. A FlexE-based bearer network accesses various types of services during application. A moment at which a service code block arrives and a moment at which a slot channel provided by the FlexE for use by the service code block arrives are random. Consequently, an uplink latency and a downlink latency may be asymmetric because a latency of a unidirectional transmission link in the FlexE is uncertain. However, some services, for example, a common public radio interface (Common Public Radio Interface, CPRI) service, in the FlexE require symmetry of an uplink latency and a downlink latency. To implement symmetry of an uplink latency and a downlink latency, an asymmetric uplink and downlink latency need to be first determined, and the asymmetric latency is then compensated for.

Currently, a manner of determining an asymmetric uplink and downlink latency is: A provider edge (provider edge, PE) of a next generation Ethernet (XE) transport network that uses a FlexE technology synchronizes a time and a frequency with that of a GPS satellite by using a global positioning system (Global Positioning System, GPS). FIG. 1 is a schematic diagram of a corresponding scenario. It can be learned that when an uplink latency of a service is measured, a service sending device (which belongs to the PE) attaches a time stamp T1 when sending the service, and a service receiving device (which belongs to the PE) attaches a time stamp T2 when receiving the service. The service receiving device then sends the time stamp T2 to the service sending device, and the service sending device calculates the uplink latency based on the time stamp T1 and the time stamp T2, where the uplink latency is equal to (T2-T1). A downlink latency of the service can be measured according to the same principle. Then, the asymmetric uplink and downlink latency may be determined based on a difference between the uplink latency of the service and the downlink latency of the service. It can be learned that this measurement method depends on the GPS of the provider edge of the network, and maintenance costs of the GPS are relatively high and an invalidity risk exists. For example, a feeder of an antenna of the GPS is relatively thick in a long distance, approximately 10% of the antenna is invalid every year, and on-site hardware replacement is required when the GPS is invalid. As a result, the maintenance costs of the GPS are very high. How to measure the asymmetric uplink and downlink latency while reducing the maintenance costs and avoiding the invalidity risk is a technical problem being studied by a person skilled in the art.

SUMMARY

Embodiments of the present invention disclose a flexible Ethernet latency measurement method and a related device, to reduce costs for measuring an asymmetric uplink and downlink latency.

A first aspect of the embodiments of the present invention discloses a flexible Ethernet latency measurement method. The method includes:

determining, by a first node, first duration based on a first downlink transmission time interval and a second downlink receiving time interval, where the first downlink transmission time interval is a time interval between a time point at which the first node obtains a first service code block and a time point at which the first node sends a first downlink sending reference code block, the second downlink receiving time interval is a time interval between a time point at which the second node receives the first service code block and a time point at which the second node receives a first downlink receiving reference code block, the first service code block is used to carry a service flow sent by the first node to the second node, the first downlink sending reference code block is a code block used for downlink alignment when the first node sends the first service code block, and the first downlink receiving reference code block is a code block used for downlink alignment when the second node receives the first service code block; determining, by the first node, second duration based on a first uplink transmission time interval and a second uplink receiving time interval, where the first uplink transmission time interval is a time interval between a time point at which the second node obtains a second service code block and a time point at which the second node sends a second uplink sending reference code block, the second uplink receiving time interval is a time interval between a time point at which the first node receives the second service code block and a time point at which the first node receives a second uplink receiving reference code block, the second service code block is used to carry a service flow sent by the second node to the first node, the second uplink sending reference code block is a code block used for uplink alignment when the second node sends the second service code block, and the second uplink receiving reference code block is a code block used for uplink alignment when the first node receives the second service code block; and calculating, by the first node, an uplink and downlink latency difference between the first node and the second node based on the first duration and the second duration.

By performing the foregoing steps, the first node determines the first duration based on a time interval between a time point of sending the first service code block on the first node and the time point of sending the first downlink sending reference code block on the first node, and the time interval between the time point of receiving the first service code block on the second node and the time point of receiving the first downlink receiving reference code block on the second node, determines the second duration based on a time interval between a time point of sending the second service code block on the second node and the time point of sending the second uplink sending reference code block on the second node, and the time interval between the time point of receiving the second service code block on the first node and the time point of receiving the second uplink receiving reference code block on the first node, and then determines the uplink and downlink latency difference between the first node and the second node based on a difference between the first duration and the second duration. This process does not need to depend on time synchronization performed by a GPS, so that stability is better and costs are lower.

With reference to the first aspect, in a first possible implementation of the first aspect, a communications link between the first node and the second node does not pass through an intermediate node other than the first node and the second node, or a communications link between the first node and the second node is transparently transmitted through an intermediate node, and in this case the first duration, the first downlink transmission time interval, and the second downlink receiving time interval satisfy the following relationship: $DT=dtt(0)-drt(n+1)$, where DT is the first duration, $dtt(0)$ is the first downlink transmission time interval, and $drt(n+1)$ is the second downlink receiving time interval; and the second duration, the first uplink transmission time interval, and the second uplink receiving time interval satisfy the following relationship: $UT=utt(0)-urt(n+1)$, where UT is the second duration, $utt(0)$ is the first uplink transmission time interval, and $urt(n+1)$ is the second uplink receiving time interval.

With reference to any one of the first aspect or the foregoing possible implementation of the first aspect, in a second possible implementation of the first aspect, a communications link between the first node and the second node passes through n intermediate nodes in non-transparent transmission mode, where n is a positive integer greater than or equal to 1, and in this case the first duration, the first downlink transmission time interval, and the second downlink receiving time interval satisfy the following relationship: $DT=[dtt(0)-drt(1)]+[dtt(1)-drt(2)]+ \ldots +[dtt(i)-drt(i+1)]+ \ldots +[dtt(n)-drt(n+1)]$, where DT is the first duration; $dtt(0)$ is the first downlink transmission time interval; $drt(n+1)$ is the second downlink receiving time interval; $drt(i)$ is a time interval between a time point at which an $i^{th}$ intermediate node in the n intermediate nodes receives the first service code block and a time point at which the $i^{th}$ intermediate node receives a third downlink receiving reference code block, and the third downlink receiving reference code block is a code block used for downlink alignment when the $i^{th}$ intermediate node receives the first service code block; and $dtt(i)$ is a time interval between the time point at which the $i^{th}$ intermediate node in the n intermediate nodes receives the first service code block and a time point at which the $i^{th}$ intermediate node sends a third downlink sending reference code block, and the third downlink sending reference code block is a code block used for downlink alignment when the $i^{th}$ intermediate node sends the first service code block, where $n \geq i \geq 1$; and the second duration, the first uplink transmission time interval, and the second uplink receiving time interval satisfy the following relationship: $UT=[utt(0)-urt(1)]+[utt(1)-urt(2)]+ \ldots +[utt(j)-urt(j+1)]+ \ldots +[utt(n)-urt(n+1)]$, where UT is the second duration; $utt(0)$ is the first uplink transmission time interval; $urt(n+1)$ is the second uplink receiving time interval; $urt(j)$ is a time interval between a time point at which a $j^{th}$ intermediate node in the n intermediate nodes receives the second service code block and a time point at which the $j^{th}$ intermediate node receives a fourth uplink receiving reference code block, and the fourth uplink receiving reference code block is a code block used for uplink alignment when the $j^{th}$ intermediate node receives the second service code block; and $utt(j)$ is a time interval between the time point at which the $j^{th}$ intermediate node in the n intermediate nodes receives the second service code block and a time point at which the $j^{th}$ intermediate node sends a fourth uplink sending reference code block, and the fourth uplink sending reference code block is a code block used for uplink alignment when the $j^{th}$ intermediate node sends the second service code block, where $n \geq j \geq 1$.

With reference to any one of the first aspect or the foregoing possible implementations of the first aspect, in a third possible implementation of the first aspect, before the determining, by a first node, first duration based on a first downlink transmission time interval and a second downlink receiving time interval, the method further includes: recording, by the first node, the first downlink transmission time interval $dtt(0)$; sending, by the first node, first indication information to the second node and the n intermediate nodes, where the first indication information is used to indicate the first service code block, and the first service code block is used to instruct the second node and the intermediate nodes to record downlink receiving time intervals and downlink transmission time intervals; receiving, by the first node, the downlink transmission time intervals and the downlink receiving time intervals that are separately sent by the n intermediate nodes, and the second downlink receiving time interval $drt(n+1)$ sent by the second node, where the downlink receiving time interval sent by the $i^{th}$ intermediate node is $drt(i)$, and the downlink transmission time interval sent by the $i^{th}$ intermediate node is $dtt(i)$.

With reference to any one of the first aspect or the foregoing possible implementations of the first aspect, in a fourth possible implementation of the first aspect, before the determining, by a first node, first duration based on a first downlink transmission time interval and a second downlink receiving time interval, the method further includes: receiving, by the first node, the first uplink transmission time interval $utt(0)$ sent by the second node, and uplink receiving time intervals and uplink transmission time intervals that are separately sent by the n intermediate nodes, where the uplink receiving time interval sent by the $j^{th}$ intermediate node is $urt(j)$, and the uplink transmission time interval sent by the $j^{th}$ intermediate node is $utt(j)$; receiving, by the first node, second indication information sent by the second node, where the second indication information is used to indicate the second service code block; and recording, by the first node, the second uplink receiving time interval $urt(n+1)$ according to the second indication information.

With reference to any one of the first aspect or the foregoing possible implementations of the first aspect, in a fifth possible implementation of the first aspect, the uplink transmission time intervals and the uplink receiving time intervals that are separately sent by the n intermediate nodes, and the first uplink transmission time interval $dtt(n+1)$ sent by the second node are carried in a latency delivery operation, administration, and maintenance OAM code block.

With reference to any one of the first aspect or the foregoing possible implementations of the first aspect, in a sixth possible implementation of the first aspect, the downlink transmission time intervals and the downlink receiving time intervals that are separately sent by the n intermediate nodes, and the second downlink receiving time interval $drt(n+1)$ sent by the second node are carried in the latency delivery operation, administration, and maintenance OAM code block.

With reference to any one of the first aspect or the foregoing possible implementations of the first aspect, in a seventh possible implementation of the first aspect, the first service code block is a frame header of a first service, and the second service code block is a frame header of a second service.

According to a second aspect, an embodiment of this application provides a flexible Ethernet latency measurement method. The method includes:

receiving, by a second node, first indication information sent by a first node, where the first indication information is used to indicate a first service code block; recording, by the second node, a second downlink receiving time interval according to the indication information, where the second downlink receiving time interval is a time interval between a time point at which the second node receives the first service code block and a time point at which the second node receives a first downlink receiving reference code block, the first service code block is used to carry a service flow sent by the first node to the second node, and the first downlink receiving reference code block is a code block used for downlink alignment when the second node receives the first service code block; and sending, by the second node, the second downlink receiving time interval and a first uplink transmission time interval to the first node, where the first uplink transmission time interval is a time interval between a time point at which the second node obtains a second service code block and a time point at which the second node sends a second uplink sending reference code block, the first uplink transmission time interval and the second downlink receiving time interval are used to determine an uplink and downlink latency difference between the first node and the second node, the second service code block is used to carry a service flow sent by the second node to the first node, and the second uplink sending reference code block is a code block used for uplink alignment when the second node sends the second service code block.

By performing the foregoing steps, the first node determines first duration based on a time interval between a time point of sending the first service code block on the first node and a time point of sending the first downlink sending reference code block on the first node, and the time interval between the time point of receiving the first service code block on the second node and the time point of receiving the first downlink receiving reference code block on the second node, determines second duration based on a time interval between a time point of sending the second service code block on the second node and the time point of sending the second uplink sending reference code block on the second node, and a time interval between a time point of receiving the second service code block on the first node and a time point of receiving a second uplink receiving reference code block on the first node, and then determines the uplink and downlink latency difference between the first node and the second node based on a difference between the first duration and the second duration. This process does not need to depend on time synchronization performed by a GPS, so that stability is better and costs are lower.

With reference to the second aspect, in a first possible implementation of the second aspect, the method further includes: sending, by the second node, second indication information to the first node, where the second indication information is used to indicate the second service code block, the second service code block is used to instruct the first node to determine a second uplink receiving time interval, the second uplink receiving time interval is the time interval between the time point at which the first node receives the second service code block and the time point at which the first node receives the second uplink receiving reference code block, and the second uplink receiving reference code block is a code block used for uplink alignment when the first node receives the second service code block.

With reference to any one of the second aspect or the foregoing possible implementation of the second aspect, in a second possible implementation of the second aspect, the first service code block is a frame header of a first service, and the second service code block is a frame header of a second service.

According to a third aspect, an embodiment of this application provides a node. The node includes a processor and a memory, where the memory is configured to store a program instruction, and the processor is configured to invoke the program instruction to perform the following operations:

determining first duration based on a first downlink transmission time interval and a second downlink receiving time interval, where the first downlink transmission time interval is a time interval between a time point at which the node obtains a first service code block and a time point at which the node sends a first downlink sending reference code block, the second downlink receiving time interval is a time interval between a time point at which a second node receives the first service code block and a time point at which the second node receives a first downlink receiving reference code block, the first service code block is used to carry a service flow sent by the node to the second node, the first downlink sending reference code block is a code block used for downlink alignment when the node sends the first service code block, and the first downlink receiving reference code block is a code block used for downlink alignment when the second node receives the first service code block; then determining second duration based on a first uplink transmission time interval and a second uplink receiving time interval, where the first uplink transmission time interval is a time interval between a time point at which the second node obtains a second service code block and a time point at which the second node sends a second uplink sending reference code block, the second uplink receiving time interval is a time interval between a time point at which the node receives the second service code block and a time point at which the node receives a second uplink receiving reference code block, the second service code block is used to carry a service flow sent by the second node to the node, the second uplink sending reference code block is a code block used for uplink alignment when the second node sends the second service code block, and the second uplink receiving reference code block is a code block used for uplink alignment when the node receives the second service code block; and subsequently calculating an uplink and downlink latency difference between the node and the second node based on the first duration and the second duration.

By performing the foregoing operations, the node determines the first duration based on a time interval between a time point of sending the first service code block on the node and the time point of sending the first downlink sending reference code block on the node, and the time interval between the time point of receiving the first service code block on the second node and the time point of receiving the first downlink receiving reference code block on the second node, determines the second duration based on a time interval between a time point of sending the second service code block on the second node and the time point of sending the second uplink sending reference code block on the second node, and the time interval between the time point of receiving the second service code block on the node and the time point of receiving the second uplink receiving reference code block on the node, and then determines the uplink and downlink latency difference between the node and the second node based on a difference between the first duration and the second duration. This process does not need to depend on time synchronization performed by a GPS, so that stability is better and costs are lower.

With reference to the third aspect, in a first possible implementation of the third aspect, a communications link between the node and the second node does not pass through an intermediate node other than the node and the second node, or a communications link between the node and the second node is transparently transmitted through an intermediate node, and in this case the first duration, the first downlink transmission time interval, and the second downlink receiving time interval satisfy the following relationship: $DT=dtt(0)-drt(n+1)$, where DT is the first duration, $dtt(0)$ is the first downlink transmission time interval, and $drt(n+1)$ is the second downlink receiving time interval; and the second duration, the first uplink transmission time interval, and the second uplink receiving time interval satisfy the following relationship: $UT=utt(0)-urt(n+1)$, where UT is the second duration, $utt(0)$ is the first uplink transmission time interval, and $urt(n+1)$ is the second uplink receiving time interval.

With reference to any one of the third aspect or the foregoing possible implementation of the third aspect, in a second possible implementation of the third aspect, a communications link between the node and the second node passes through n intermediate nodes in non-transparent transmission mode, where n is a positive integer greater than or equal to 1, and in this case the first duration, the first downlink transmission time interval, and the second downlink receiving time interval satisfy the following relationship: $DT=[dtt(0)-drt(1)]+[dtt(1)-drt(2)]+ \ldots +[dtt(i)-drt(i+1)]+ \ldots +[dtt(n)-drt(n+1)]$, where DT is the first duration; $dtt(0)$ is the first downlink transmission time interval; $drt(n+1)$ is the second downlink receiving time interval; $drt(i)$ is a time interval between a time point at which an $i^{th}$ intermediate node in the n intermediate nodes receives the first service code block and a time point at which the $i^{th}$ intermediate node receives a third downlink receiving reference code block, and the third downlink receiving reference code block is a code block used for downlink alignment when the $i^{th}$ intermediate node receives the first service code block; and $dtt(i)$ is a time interval between the time point at which the $i^{th}$ intermediate node in the n intermediate nodes receives the first service code block and a time point at which the $i^{th}$ intermediate node sends a third downlink sending reference code block, and the third downlink sending reference code block is a code block used for downlink alignment when the $i^{th}$ intermediate node sends the first service code block, where $n \geq i \geq 1$; and the second duration, the first uplink transmission time interval, and the second uplink receiving time interval satisfy the following relationship: $UT=[utt(0)-urt(1)]+[utt(1)-urt(2)]+ \ldots +[utt(j)-urt(j+1)]+ \ldots +[utt(n)-urt(n+1)]$, where UT is the second duration; $utt(0)$ is the first uplink transmission time interval; $urt(n+1)$ is the second uplink receiving time interval; $urt(j)$ is a time interval between a time point at which a $j^{th}$ intermediate node in the n intermediate nodes receives the second service code block and a time point at which the $j^{th}$ intermediate node receives a fourth uplink receiving reference code block, and the fourth uplink receiving reference code block is a code block used for uplink alignment when the $j^{th}$ intermediate node receives the second service code block; and $utt(j)$ is a time interval between the time point at which the $j^{th}$ intermediate node in the n intermediate nodes receives the second service code block and a time point at which the $j^{th}$ intermediate node sends a fourth uplink sending reference code block, and the fourth uplink sending reference code block is a code block used for uplink alignment when the $j^{th}$ intermediate node sends the second service code block, where $n \geq j \geq 1$.

With reference to any one of the third aspect or the foregoing possible implementations of the third aspect, in a third possible implementation of the third aspect, the node further includes a receiver and a transmitter; and before determining the first duration based on the first downlink transmission time interval and the second downlink receiving time interval, the processor is further configured to: record the first downlink transmission time interval $dtt(0)$; send first indication information to the second node and the n intermediate nodes by using the transmitter, where the first indication information is used to indicate the first service code block, the first service code block is used to instruct the second node and the intermediate nodes to record downlink receiving time intervals and downlink transmission time intervals; receive, by using the receiver, the downlink transmission time intervals and the downlink receiving time intervals that are separately sent by the n intermediate nodes, and the second downlink receiving time interval $drt(n+1)$ sent by the second node, where the downlink receiving time interval sent by the $i^{th}$ intermediate node is $drt(i)$, and the downlink transmission time interval sent by the $i^{th}$ intermediate node is $dtt(i)$.

With reference to any one of the third aspect or the foregoing possible implementations of the third aspect, in a fourth possible implementation of the third aspect, the node further includes a receiver; and before determining the first duration based on the first downlink transmission time interval and the second downlink receiving time interval, the processor is further configured to: receive, by using the receiver, the first uplink transmission time interval $utt(0)$ sent by the second node, and uplink receiving time intervals and uplink transmission time intervals that are separately sent by the n intermediate nodes, where the uplink receiving time interval sent by the $j^{th}$ intermediate node is $urt(j)$, and the uplink transmission time interval sent by the $j^{th}$ intermediate node is $utt(j)$; receive, by using the receiver, second indication information sent by the second node, where the second indication information is used to indicate the second service code block; and record the second uplink receiving time interval $urt(n+1)$ according to the second indication information.

With reference to any one of the third aspect or the foregoing possible implementations of the third aspect, in a fifth possible implementation of the third aspect, the uplink transmission time intervals and the uplink receiving time intervals that are separately sent by the n intermediate nodes, and the first uplink transmission time interval $dtt(n+1)$ sent by the second node are carried in a latency delivery operation, administration, and maintenance OAM code block.

With reference to any one of the third aspect or the foregoing possible implementations of the third aspect, in a sixth possible implementation of the third aspect, the downlink transmission time intervals and the downlink receiving time intervals that are separately sent by the n intermediate nodes, and the second downlink receiving time interval $drt(n+1)$ sent by the second node are carried in the latency delivery OAM code block.

With reference to any one of the third aspect or the foregoing possible implementations of the third aspect, in a seventh possible implementation of the third aspect, the first service code block is a frame header of a first service, and the second service code block is a frame header of a second service.

According to a fourth aspect, an embodiment of this application provides a node. The node includes a processor, a memory, a receiver, and a transmitter, where the memory is configured to store a program instruction, and the processor is configured to invoke the program instruction to perform the following operations:

receiving, by using the receiver, first indication information sent by a first node, where the first indication information is used to indicate a first service code block; recording a second downlink receiving time interval according to the indication information, where the second downlink receiving time interval is a time interval between a time point at which the node receives the first service code block and a time point at which the node receives a first downlink receiving reference code block, the first service code block is used to carry a service flow sent by the first node to the node, and the first downlink receiving reference code block is a code block used for downlink alignment when the node receives the first service code block; and sending the second downlink receiving time interval and a first uplink transmission time interval to the first node by using the transmitter, where the first uplink transmission time interval is a time interval between a time point at which the node obtains a second service code block and a time point at which the node sends a second uplink sending reference code block, the first uplink transmission time interval and the second downlink receiving time interval are used to determine an uplink and downlink latency difference between the first node and the node, the second service code block is used to carry a service flow sent by the node to the first node, and the second uplink sending reference code block is a code block used for uplink alignment when the node sends the second service code block.

By performing the foregoing operations, the first node determines first duration based on a time interval between a time point of sending the first service code block on the first node and a time point of sending a first downlink sending reference code block on the first node, and the time interval between the time point of receiving the first service code block on the node and the time point of receiving the first downlink receiving reference code block on the node, determines second duration based on a time interval between a time point of sending the second service code block on the node and the time point of sending the second uplink sending reference code block on the node, and a time interval between a time point of receiving the second service code block on the first node and a time point of receiving a second uplink receiving reference code block on the first node, and then determines the uplink and downlink latency difference between the first node and the node based on a difference between the first duration and the second duration. This process does not need to depend on time synchronization performed by a GPS, so that stability is better and costs are lower.

With reference to the fourth aspect, in a first possible implementation of the fourth aspect, the processor is further configured to:

send second indication information to the first node by using the transmitter, where the second indication information is used to indicate the second service code block, the second service code block is used to instruct the first node to determine a second uplink receiving time interval, the second uplink receiving time interval is the time interval between the time point at which the first node receives the second service code block and the time point at which the first node receives the second uplink receiving reference code block, and the second uplink receiving reference code block is a code block used for uplink alignment when the first node receives the second service code block.

With reference to any one of the fourth aspect or the foregoing possible implementation of the fourth aspect, in a second possible implementation of the fourth aspect, the first service code block is a frame header of a first service, and the second service code block is a frame header of a second service.

According to a fifth aspect, an embodiment of this application provides a first node. The first node includes a unit configured to perform the method according to any one of the first aspect or the possible implementations of the first aspect.

According to a sixth aspect, an embodiment of this application provides a second node. The second node includes a unit configured to perform the method according to any one of the second aspect or the possible implementations of the second aspect.

According to a seventh aspect, an embodiment of this application provides a chip system. The chip system includes at least one processor, a memory, and an interface circuit, where the memory, the interface circuit, and the at least one processor are connected to each other by using a line, and the at least one memory stores a program instruction, and when the program instruction is executed by the processor, the method described in any one of the first aspect or the possible implementations of the first aspect, or any one of the second aspect or the possible implementations of the second aspect is implemented.

According to an eighth aspect, an embodiment of this application provides a computer-readable storage medium. The computer-readable storage medium stores a program instruction, and when the program instruction is run on a processor, the method described in any one of the first aspect or the possible implementations of the first aspect, or any one of the second aspect or the possible implementations of the second aspect is implemented.

According to a ninth aspect, an embodiment of this application provides a computer program product. When the computer program product is run on a processor, the method described in any one of the first aspect or the possible implementations of the first aspect, or any one of the second aspect or the possible implementations of the second aspect is implemented.

By implementing the embodiments of the present invention, the first node determines the first duration based on the time interval between the time point of sending the first service code block on the first node and the time point of sending the first downlink sending reference code block on the first node, and the time interval between the time point of receiving the first service code block on the second node and the time point of receiving the first downlink receiving reference code block on the second node, determines the second duration based on the time interval between the time point of sending the second service code block on the second node and the time point of sending the second uplink sending reference code block on the second node, and the time interval between the time point of receiving the second service code block on the first node and the time point of receiving the second uplink receiving reference code block on the first node, and then determines the uplink and downlink latency difference between the first node and the second node based on the difference between the first duration and the second duration. This process does not need to depend on the time synchronization performed by the GPS, so that the stability is better and the costs are lower.

BRIEF DESCRIPTION OF DRAWINGS

Accompanying drawings used in the embodiments of the present invention are described below.

DESCRIPTION OF EMBODIMENTS

The embodiments of the present invention are described below with reference to the accompanying drawings in the embodiments of the present invention.

Figure 1:
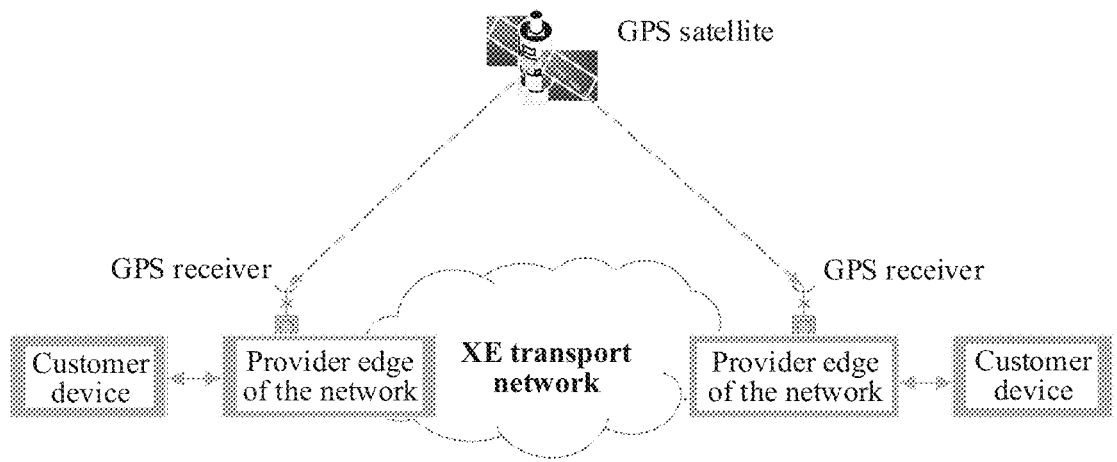
FIG. 1 is a schematic diagram of an uplink and downlink latency measurement scenario in the related art.
Figure 2:
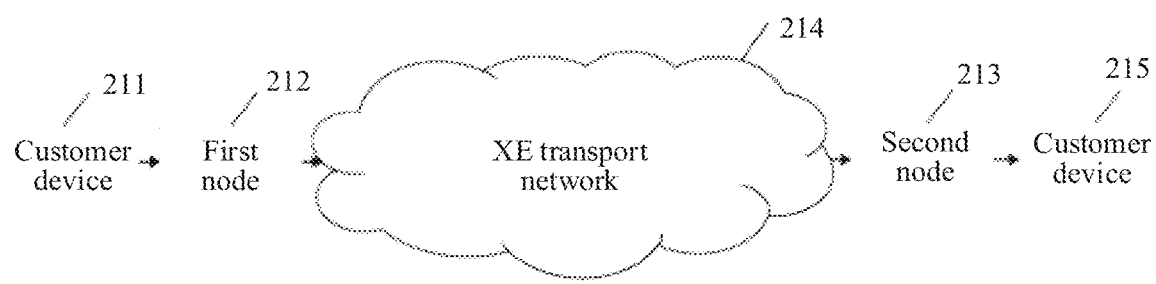
FIG. 2 is a schematic architectural diagram of a communications system according to an embodiment of the present invention.

FIG. 2 is a schematic architectural diagram of a communications system according to an embodiment of the present invention. The communications system includes a customer device 211, a first node 212, a second node 213, an XE transport network 214, and a customer device 215. The devices in the communications system communicate with each other based on a flexible Ethernet (FlexE) technology. The first node 212 and the second node 213 belong to a provider edge PE in the XE transport network 214. A service sent by the customer device 211 is transmitted to the XE transport network 214 by using the first node 212, then transmitted from the XE transport network 214 to the second node 213, and then transmitted by the second node 213 to the customer device 215. A service sent by the customer device 215 is transmitted to the XE transport network 214 by using the second node 213, then is transmitted from the XE transport network 214 to the first node 212, and then is transmitted by the first node 212 to the customer device 211. It should be noted that there may be one or more customer devices connected to the first node 212, and there may also be one or more customer devices connected to the second node 213. In FIG. 2, an example in which the first node 212 and the second node 213 are each connected to one customer device is used for description. In addition, a link between the first node 212 and the second node 213 in the XE transport network 214 may pass through an intermediate node, or may not pass through an intermediate node. When passing through an intermediate node, the link may pass through one or more intermediate nodes. It may be understood that the XE transport network 214 may alternatively be replaced with another network.

Figure 3:
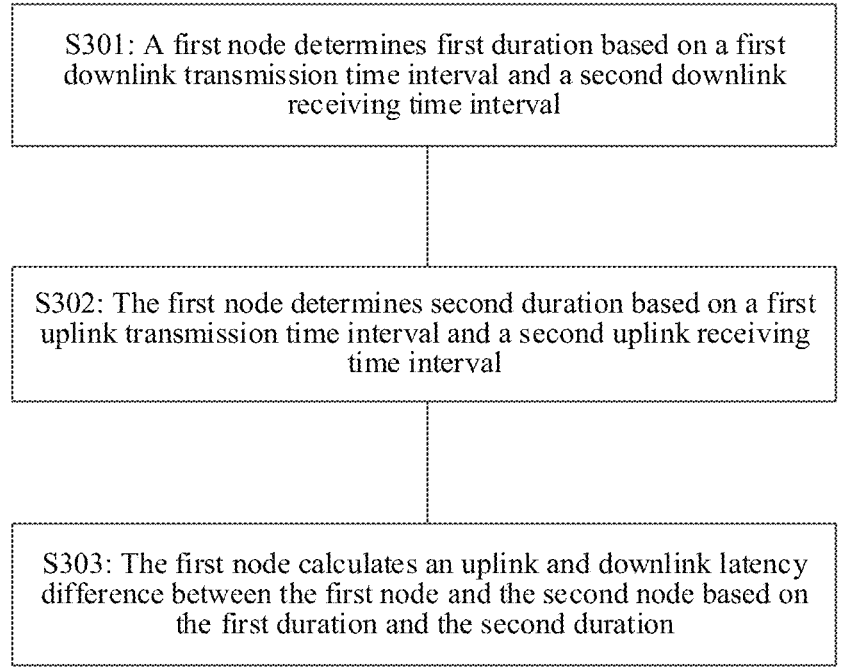
FIG. 3 is a schematic flowchart of a flexible Ethernet latency measurement method according to an embodiment of the present invention.

FIG. 3 shows a flexible Ethernet latency measurement method according to an embodiment of the present invention. The method may be implemented based on the architecture shown in FIG. 2. The method includes, but is not limited to, the following steps.

Step S301: A first node determines first duration based on a first downlink transmission time interval and a second downlink receiving time interval.

In other words, in this embodiment of this application, the first downlink transmission time interval and the second downlink receiving time interval need to be used to determine the first duration. The first downlink transmission time interval is a time interval between a time point at which the first node obtains a first service code block and a time point at which the first node sends a first downlink sending reference code block, and the second downlink receiving time interval is a time interval between a time point at which the second node receives the first service code block and a time point at which the second node receives a first downlink receiving reference code block. The first service code block is used to carry a service flow sent by the first node to the second node. In addition, the first downlink sending reference code block is a code block used for downlink alignment when the first node sends the first service code block, and the first downlink receiving reference code block is a code block used for downlink alignment when the second node receives the first service code block. In addition, in this embodiment of this application, that the first node obtains a first service code block includes: generating the first service code block or receiving the first service code block (sent by another node). Manners of determining the first duration may be different in different cases. Two possible cases are listed below.

Case 1: A communications link between the first node and the second node does not pass through another intermediate node, or a communications link between the first node and the second node is transparently transmitted through an intermediate node, and in this case, the manner of determining the first duration is described below.

The first node records the first downlink transmission time interval, for example, starts timing when obtaining the first service code block, and ends timing when sending the first downlink sending reference code block, so that a time length recorded from start of timing to end of timing by the first node is the first downlink transmission time interval. The first node sends first indication information to the second node, and the first indication information is used to indicate the first service code block. Correspondingly, the second node receives the first indication information, determines, according to the first indication information, to start timing when receiving the first service code block, and further ends timing when receiving the first downlink receiving reference code block, so that a time length recorded from start of timing to end of timing by the second node is the second downlink receiving time interval. Then, the second node sends the second downlink receiving time interval to the first node, and the first node receives the second downlink receiving time interval sent by the second node. Finally, the first node calculates the first duration based on the first downlink transmission time interval and the second downlink receiving time interval. The first duration $DT=dtt(0)-drt(n+1)$, where $dtt(0)$ is the first downlink transmission time interval, and drt(n+1) is the second downlink receiving time interval. In this case, the first downlink sending reference code block and the first downlink receiving reference code block are a same code block.

Case 2: A communications link between the first node and the second node passes through n intermediate nodes in non-transparent transmission mode. Therefore, the first service code block sent by the first node to the second node passes through the n intermediate nodes. In this case, the manner of determining the first duration is described below.

The first node records the first downlink transmission time interval, for example, starts timing when obtaining the first service code block, and ends timing when sending the first downlink sending reference code block, so that a time length recorded from start of timing to end of timing by the first node is the first downlink transmission time interval.

The first node sends first indication information to the second node and the n intermediate nodes, and the first indication information is used to indicate the first service code block. It may be understood that the first node sends first indication information to the second node, and the first indication information passes through the n intermediate nodes. Therefore, it may be considered that the first node sends the first indication information to the n intermediate nodes. Correspondingly, the second node receives the first indication information, determines, according to the first indication information, to start timing when receiving the first service code block, and further ends timing when receiving the first downlink receiving reference code block, so that a time length recorded from start of timing to end of timing by the second node is the second downlink receiving time interval. Then, the second node sends the second downlink receiving time interval to the first node.

The intermediate nodes receive the first indication information, determine, according to the first indication information, to start timing when receiving the first service code block, and further end timing when receiving a third downlink receiving reference code block. The third downlink receiving reference code block is a code block used for downlink alignment when the $i^{th}$ intermediate node receives the first service code block, and time lengths recorded from start of timing to end of timing by the n intermediate nodes are recorded downlink receiving time intervals. The downlink receiving time interval recorded by an $i^{th}$ intermediate node in the n intermediate nodes is drt(i), the n intermediate nodes then send the downlink receiving time intervals recorded by the n intermediate nodes to the first node. In addition, the $i^{th}$ intermediate node further needs to send the first service code block to an $(i+1)^{th}$ intermediate node. The $i^{th}$ intermediate node starts timing when receiving the first service code block and ends timing when receiving a third downlink sending reference code block. The third downlink sending reference code block is a code block used for downlink alignment when the is intermediate node sends the first service code block, and a time length recorded from start of timing to end of timing by the $i^{th}$ intermediate node is a downlink transmission time interval dtt(i) recorded by the $i^{th}$ intermediate node. The n intermediate nodes then send downlink transmission time intervals recorded by the n intermediate nodes to the first node, where n≥i≥1. It may be understood that the downlink receiving time interval and the downlink transmission time interval that are recorded by the $i^{th}$ intermediate node may be sent to the first node together (for example, the downlink receiving time interval and the downlink transmission time interval may be encapsulated in a same piece of information), or may be separately sent to the first node. Optionally, the $i^{th}$ intermediate node in the n intermediate nodes may be specifically an $i^{th}$ intermediate node, in the n intermediate nodes, that receives the first service code block in chronological order.

The first node receives the second downlink receiving time interval sent by the second node, and the downlink receiving time intervals and the downlink transmission time intervals that are separately sent by the n intermediate nodes.

The first node calculates the first duration based on the first downlink transmission time interval, the second downlink receiving time interval, and the downlink receiving time intervals and the downlink transmission time intervals that are separately sent by the n intermediate nodes. The first duration DT=[dtt(0)−drt(1)]+[dtt(1)−drt(2)]+ . . . +[dtt(i)−drt(i+1)]+ . . . +[dtt(n)−drt(n+1)], where DT is the first duration, dtt(0) is the first downlink transmission time interval, drt(n+1) is the second downlink receiving time interval, drt(i) is the downlink receiving time interval sent by the $i^{th}$ intermediate node in the n intermediate nodes, and dtt(i) is the downlink transmission time interval sent by the $i^{th}$ intermediate node in the n intermediate nodes. In this case, if one of the first node, the n intermediate nodes, and the second node sends the first service code block to another node, a code block used for downlink alignment when the node sends the first service code block is the same as a code block used for downlink alignment when the another node receives the first service code block.

Optionally, the second downlink receiving time interval sent by the second node, and the downlink receiving time intervals and the downlink transmission time intervals that are separately sent by the n intermediate nodes are carried in a latency delivery operation, administration, and maintenance (Operation, Administration and Maintenance, OAM) code block, or are all transmitted to the first node by using FlexE overheads.

Step S302: The first node determines second duration based on a first uplink transmission time interval and a second uplink receiving time interval.

In other words, in this embodiment of this application, the first uplink transmission time interval and the second uplink receiving time interval need to be used to determine the second duration. The first uplink transmission time interval is a time interval between a time point at which the second node obtains a second service code block and a time point at which the second node sends a second uplink sending reference code block, and the second uplink receiving time interval is a time interval between a time point at which the first node receives the second service code block and a time point at which the first node receives a second uplink receiving reference code block. The second service code block is used to carry a service flow sent by the second node to the first node. In addition, the second uplink sending reference code block is a code block used for uplink alignment when the second node sends the second service code block, and the second uplink receiving reference code block is a code block used for uplink alignment when the first node receives the second service code block. In addition, in this embodiment of this application, that the second node obtains a second service code block includes: generating the second service code block or receiving the second service code block (sent by another node).

Manners of determining the second duration may be different in different cases. Two possible cases are listed below.

Case 1: A communications link between the first node and the second node does not pass through another intermediate node, and in this case, the manner of determining the second duration is described below.

The second node records the first uplink transmission time interval, for example, starts timing when obtaining the second service code block, and ends timing when sending the second uplink sending reference code block, so that a time length recorded from start of timing to end of timing by the second node is the first uplink transmission time interval. The second node sends the first uplink transmission time interval to the first node. The second node further sends second indication information to the first node, and the second indication information is used to indicate the second service code block. Correspondingly, the first node receives the first uplink transmission time interval and the second indication information, determines, according to the second indication information, to start timing when receiving the second service code block, and further ends timing when receiving the second uplink receiving reference code block, so that a time length recorded from start of timing to end of timing by the first node is the second uplink receiving time interval. The first node calculates the second duration based on the first uplink transmission time interval and the second uplink receiving time interval. The second duration UT=utt(0)+urt(n+1), where utt(0) is the first uplink transmission time interval, and urt(n+1) is the second uplink receiving time interval. In this case, the second uplink sending reference code block and the second uplink receiving reference code block are a same code block.

Case 2: A communications link between the first node and the second node passes through n intermediate nodes. Therefore, the second service code block sent by the second node to the first node passes through the n intermediate nodes. In this case, the manner of determining the second duration is described below.

The second node records the first uplink transmission time interval for example, starts timing when obtaining the second service code block, and ends timing when sending the second uplink sending reference code block, so that a time length recorded from start of timing to end of timing by the second node is the first uplink transmission time interval.

The second node sends the first uplink transmission time interval to the first node. The second node further sends second indication information to the first node and the n intermediate nodes, and the second indication information is used to indicate the second service code block. It may be understood that the second node sends the second indication information to the first node, and the second indication information passes through the n intermediate nodes. Therefore, it may be considered that the second node sends the second indication information to the n intermediate nodes. Correspondingly, the first node receives the first uplink transmission time interval and the second indication information, determines, according to the second indication information, to start timing when receiving the second service code block, and further ends timing when receiving the second uplink receiving reference code block, so that a time length recorded from start of timing to end of timing by the first node is the second uplink receiving time interval.

The intermediate nodes receive the second indication information, determine, according to the second indication information, to start timing when receiving the second service code block, and further end timing when receiving an uplink receiving reference code block, so that time lengths recorded from start of timing to end of timing by the intermediate nodes are recorded uplink receiving time intervals. A $j^{th}$ intermediate node in the n intermediate nodes starts timing when receiving the second service code block, and ends timing when receiving a fourth uplink receiving reference code block, so that a time recorded from start of timing to end of timing by the $j^{th}$ intermediate node is an uplink receiving time interval urt(i) recorded by the $j^{th}$ intermediate node. The fourth uplink receiving reference code block is a code block used for uplink alignment when the $j^{th}$ intermediate node receives the second service code block. The n intermediate nodes then send the uplink receiving time intervals recorded by the n intermediate nodes to the first node, where n≥j≥1. Optionally, the $j^{th}$ intermediate node in the n intermediate nodes may be specifically a $j^{th}$ intermediate node, in the n intermediate nodes, that receives the second service code block in chronological order.

The $j^{th}$ intermediate node further needs to send the second service code block to a (j+1) intermediate node. The $j^{th}$ intermediate node starts timing when receiving the second service code block and ends timing when sending a fourth uplink sending reference code block, so that a time length recorded from start of timing to end of timing by the $j^{th}$ intermediate node is an uplink transmission time interval utt(i) recorded by the $j^{th}$ intermediate node. The fourth uplink sending reference code block is a code block used for uplink alignment when the $j^{th}$ intermediate node sends the second service code block. Then, the n intermediate nodes send uplink transmission time intervals recorded by the n intermediate nodes to the first node. It may be understood that the uplink receiving time interval and the uplink transmission time interval that are recorded by the $j^{th}$ intermediate node may be sent to the first node together (for example, the uplink receiving time interval and the uplink transmission time interval may be encapsulated in a same piece of information), or may be separately sent to the first node.

The first node receives the uplink receiving time intervals and the uplink transmission time intervals that are separately sent by the n intermediate nodes.

The first node calculates the second duration based on the first uplink transmission time interval, the second uplink receiving time interval, and the uplink transmission time intervals and the uplink receiving time intervals that are separately sent by the n intermediate nodes. The second duration UT=[utt(0)−urt(1)]+[utt(1)−urt(2)]+ . . . +[utt(j)−urt(j+1)]+ . . . +[utt(n)−urt(n+1)], where UT is the second duration, utt(0) is the first uplink transmission time interval, urt(n+1) is the second uplink receiving time interval, urt(j) is the uplink receiving time interval sent by the $j^{th}$ intermediate node in the n intermediate nodes, and utt(j) is the uplink transmission time interval sent by the $j^{th}$ intermediate node in the n intermediate nodes. In this case, if one of the first node, the n intermediate nodes, and the second node sends the second service code block to another node, a code block used for uplink alignment when the node sends the second service code block is the same as a code block used for uplink alignment when the another node receives the second service code block.

Optionally, the uplink transmission time intervals and the uplink receiving time intervals that are separately sent by the n intermediate nodes, and the first uplink transmission time interval sent by the second node are carried in a latency delivery OAM code block, or are all transmitted to the first node by using FlexE overheads.

Step S303: The first node calculates an uplink and downlink latency difference between the first node and the second node based on the first duration and the second duration.

It may be understood that calculation manners of an uplink transmission latency T1 and a downlink transmission latency T2 between the first node and the second node are as follows:

$$T1=DT+(x0+x2+ \ldots +xi+ \ldots +xn)$$

$$T2=UT+(x0+x2+\ldots+xi+\ldots+xn)$$

It is assumed that the n intermediate nodes are sorted in descending order of distances to the first node, x0 is a latency of transmission of a reference code block between the first node and the first intermediate node in the n intermediate nodes, and an uplink latency of transmission of the reference code block between the first node and the first intermediate node and a downlink latency of transmission of the reference code block between the first node and the first intermediate node are equal and are both x0; xn is a latency of transmission of the reference code block between the $n^{th}$ intermediate node and the second node, and a uplink latency of transmission of the reference code block between the n intermediate node and the second node and a downlink latency of transmission of the reference code block between the $n^{th}$ intermediate node and the second node are equal and are both xn; x1 is a latency of transmission of the reference code block between the first intermediate node and the second intermediate node, and an uplink latency of transmission of the reference code block between the first intermediate node and the second intermediate node and a downlink latency of transmission of the reference code block between the first intermediate node and the second intermediate node are equal and are both x1; x2 is a latency of transmission of the reference code block between the second intermediate node and the third intermediate node, and an uplink latency of transmission of the reference code block between the second intermediate node and the third intermediate node and a downlink latency of transmission of the reference code block between the second intermediate node and the third intermediate node are equal and are both x2; xi is a latency of transmission of the reference code block between the $i^{th}$ intermediate node and the $(i+1)^{th}$ intermediate node, and an uplink latency of transmission of the reference code block between the is intermediate node and the $(i+1)^{th}$ intermediate node and a downlink latency of transmission of the reference code block between the $i^{th}$ intermediate node and the $(i+1)^{th}$ intermediate node are equal and are both xi. The rest can be deduced by analogy. Herein, i may be an integer of 1 to n−1.

In this case, the uplink and downlink latency difference ΔT between the first node and the second node is:

$$\Delta T=T1-T2=DT-UT$$

To be specific, each of the uplink transmission latency T1 and the downlink transmission latency T2 includes a factor (x0+x2+ . . . +xi+ . . . +xn), so that when T2 is subtracted from T1, the factor (x0+x2+ . . . +xi+ . . . +xn) may be counteracted. It can be learned from the formula obtained after the factor is counteracted that the uplink and downlink latency difference ΔT is equal to a difference between the first duration and the second duration. Therefore, in this embodiment of this application, the first duration and the second duration are first determined, and the uplink and downlink latency difference between the first node and the second node is then calculated based on the first duration and the second duration.

After determining the uplink and downlink latency difference, the first node may compensate for the uplink and downlink latency difference, to implement symmetry of the uplink latency and the downlink latency. Alternatively, the first node may send information about the uplink and downlink latency difference to another device, and the another device compensates for the uplink and downlink latency difference, to implement symmetry of the uplink latency and the downlink latency. Optionally, if the downlink latency is shorter and the uplink latency is longer, an additional buffer may be added to subsequent downlink transmission, so that a latency difference between a subsequent downlink latency and a subsequent uplink latency is reduced, or the latency difference between the downlink latency and the uplink latency is reduced to zero. If the uplink latency is shorter and the downlink latency is longer, an additional buffer may be added to subsequent uplink transmission, so that a latency difference between a subsequent uplink latency and a subsequent downlink latency is reduced, or the latency difference between the uplink latency and the downlink latency is reduced to zero.

A process of determining the uplink and downlink latency difference between the first node and the second node is described on the whole in steps S301 to S303. For ease of understanding, the foregoing process is further described below by using an example with reference to a schematic diagram of a specific scenario.

Figure 4:
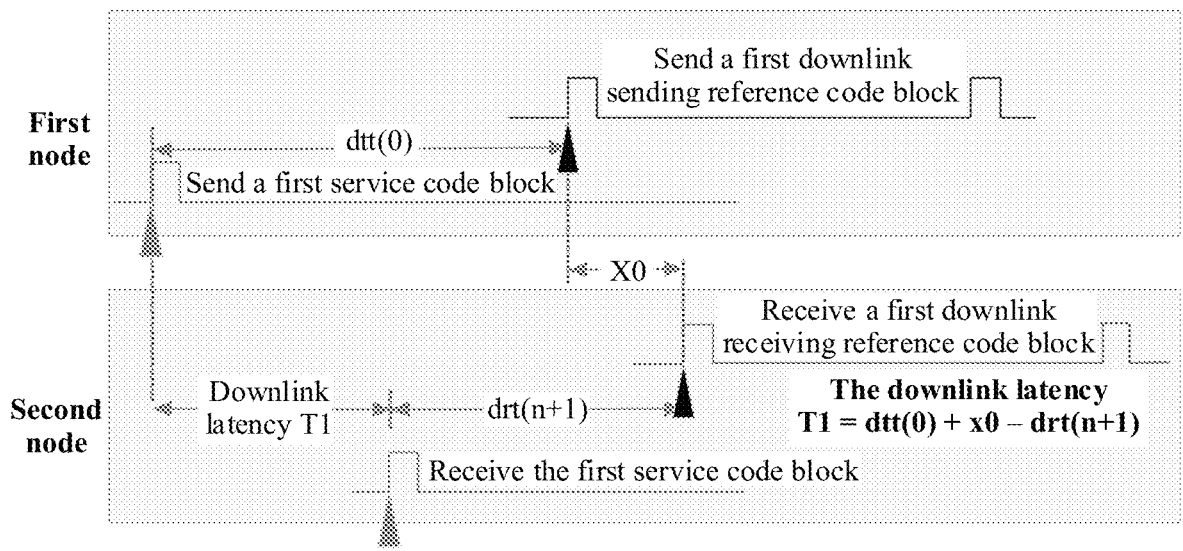
FIG. 4 is a schematic structural diagram of downlink service transmission according to an embodiment of the present invention.
Figure 5:
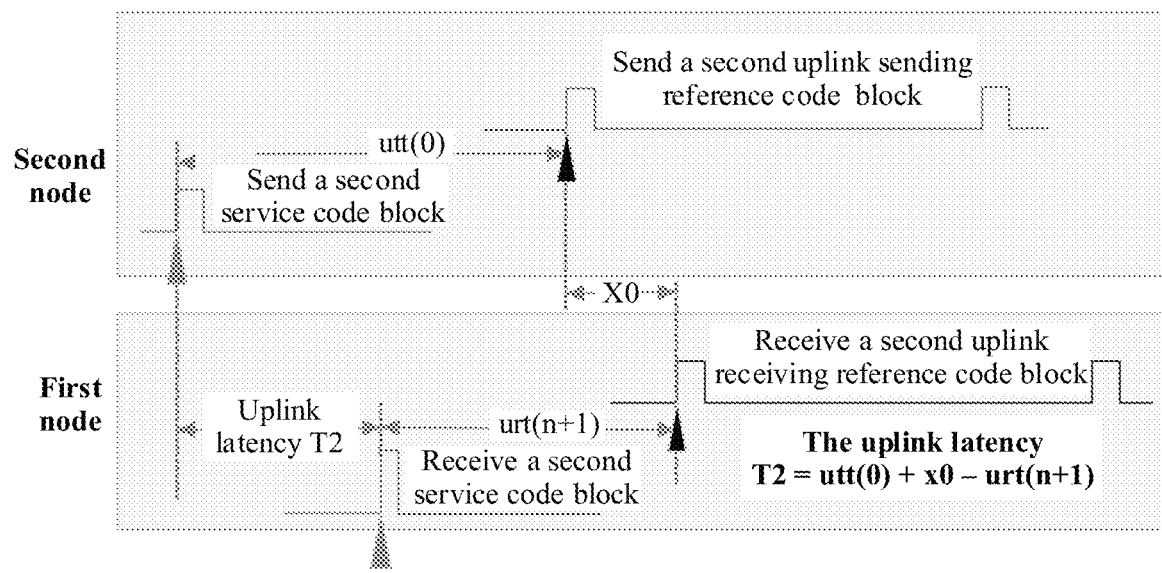
FIG. 5 is a schematic structural diagram of another downlink service transmission according to an embodiment of the present invention.

FIG. 4 and FIG. 5 are schematic diagrams of scenarios in which no intermediate node exists between a first node and a second node. In the scenarios, a process of determining an uplink and downlink latency difference between the first node and the second node is shown in steps 401 to 411.

Step 401: A network control end initiates an asymmetric latency measurement command to the first node and the second node.

Step 402: In response to the asymmetric latency measurement command, the first node inserts a unique identifiable code block (for example, a control code block identified by an unused user-defined O code in ordered sets) into a downlink service flow, and if there is a unique identifiable code block in the service data flow, no additional code block needs to be inserted, where the unique identifiable code block is subsequently referred to as a first service code block, and the first service code block is used as a latency measurement point of a downlink service.

Step 403: The first node starts a downlink sending timer when obtaining the first service code block, and records a value of the downlink sending timer when sending a first downlink sending reference code block, where the recorded value may be referred to as a first downlink transmission time interval dtt(0).

Step 404: The second node starts a downlink receiving timer when receiving the first service code block, and records a value of the downlink receiving timer when receiving a first downlink receiving reference code block, where the recorded value may be referred to as a second downlink receiving time interval drt(n+1).

Step 405: The second node inserts the second downlink receiving time interval drt(n+1) into a latency delivery OAM code block of the downlink service, to transmit the second downlink receiving time interval to the first node, and correspondingly, the first node receives the second downlink receiving time interval drt(n+1).

It can be learned from FIG. 4 that the downlink latency T1=dtt(0)+x0−drt(n+1), where x0 is a latency of transmission of the reference code block between the first node and the second node.

Step 406: In response to the asymmetric latency measurement command, the second node inserts a unique identifiable code block (for example, the control code block identified by the unused user-defined O code in the ordered sets) into an uplink service flow, and if there is a unique identifiable code block in the service data flow, no additional code block needs to be inserted, where the unique identifiable code block is subsequently referred to as a second service code block, and the second service code block is used as a latency measurement point of an uplink service.

Step 407: The second node starts an uplink sending timer when obtaining the second service code block, and records a value of the uplink sending timer when sending a second uplink sending reference code block, where the recorded value may be referred to as a first uplink transmission time interval utt(0).

Step 408: The second node inserts the first uplink transmission time interval utt(0) into a latency delivery OAM code block of the uplink service, to transmit the first uplink transmission time interval to the first node, and correspondingly, the first node receives the first uplink transmission time interval utt(0).

Step 409: The first node starts an uplink receiving timer when obtaining the second service code block, and records a value of the uplink receiving timer when receiving a second uplink receiving reference code block, where the recorded value may be referred to as a second uplink receiving time interval urt(n+1).

It can be learned from FIG. 5 that the uplink latency T2=utt(0)+x0−urt(n+1), where x0 is a latency of transmission of the reference code block between the first node and the second node.

Step 410: The first node calculates the uplink and downlink latency difference ΔT between the first node and the second node according to the following formula:

$$\Delta T = T1 - T2 = [dtt(0) - drt(n+1)] - [utt(0) - urt(n+1)]$$

Step 411: The first node performs asymmetric latency compensation on the uplink and downlink latency difference ΔT.

Figure 6:
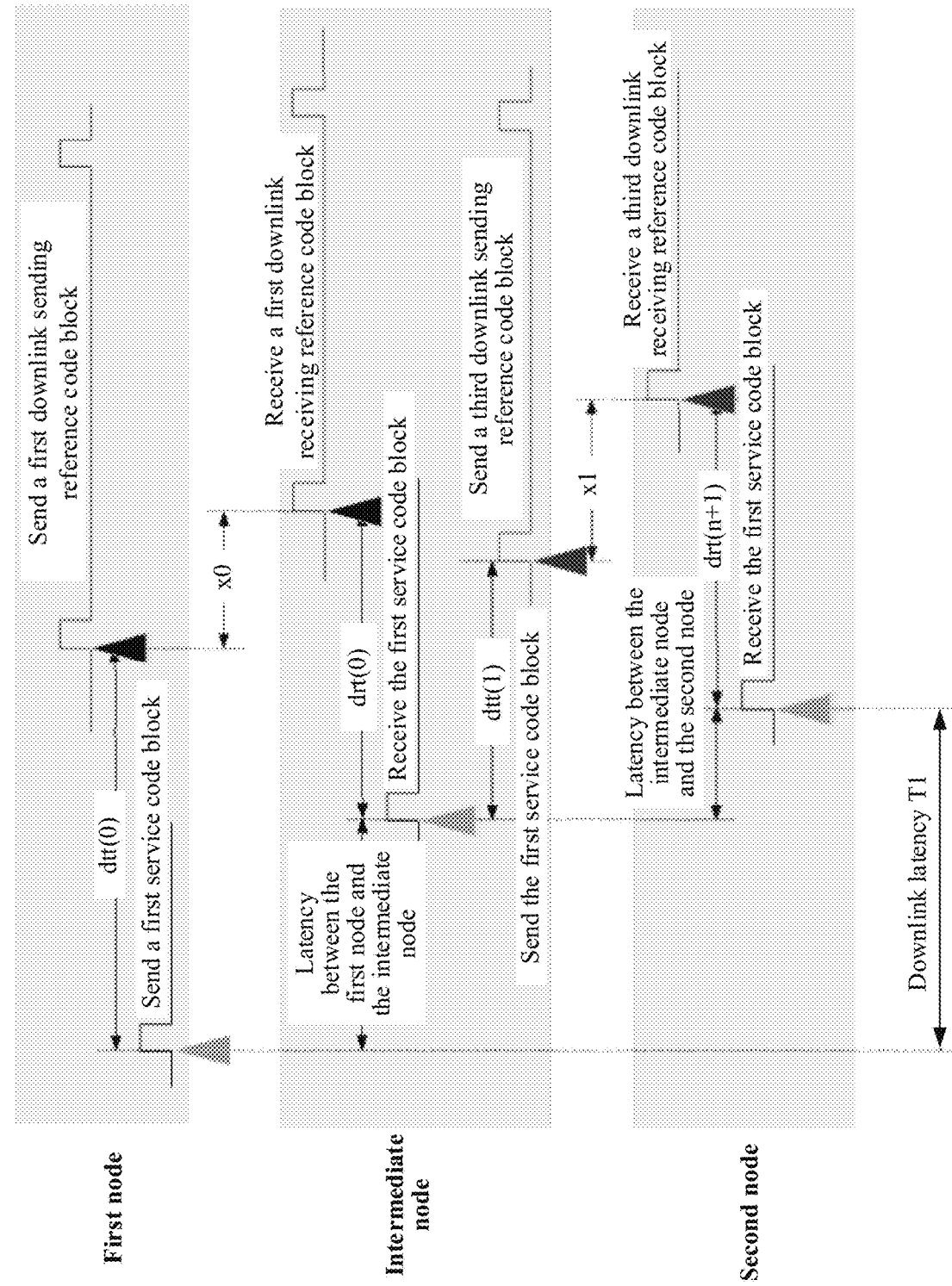
FIG. 6 is a schematic structural diagram of uplink service transmission according to an embodiment of the present invention.
Figure 7:
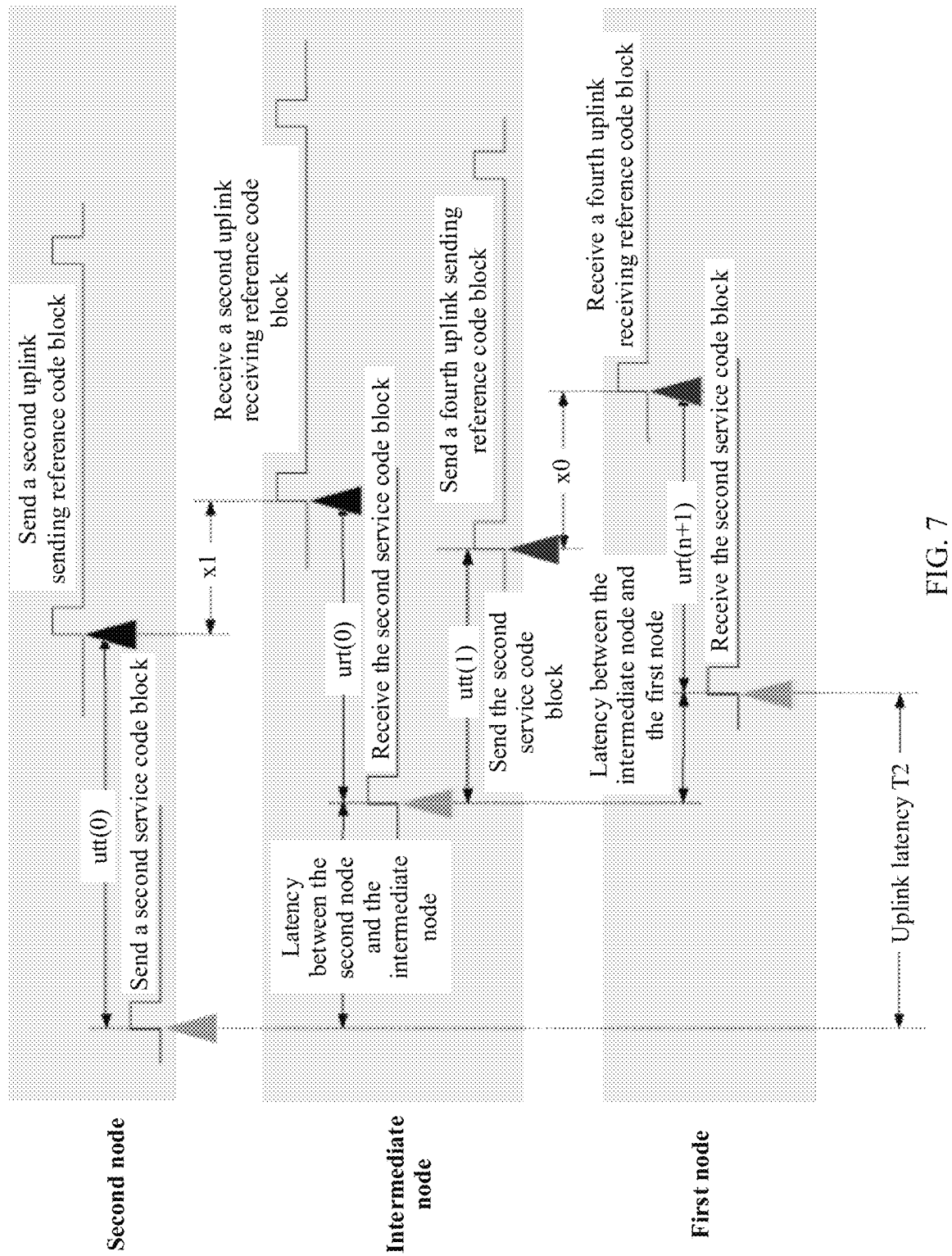
FIG. 7 is a schematic structural diagram of another uplink service transmission according to an embodiment of the present invention.

FIG. 6 and FIG. 7 are schematic diagrams of scenarios in which n intermediate nodes exist between a first node and a second node. In the scenarios, a process of determining an uplink and downlink latency difference between the first node and the second node is shown in steps 501 to 515.

Step 501: A network control end initiates an asymmetric latency measurement command to the first node and the second node.

Step 502: In response to the asymmetric latency measurement command, the first node inserts a unique identifiable code block (for example, a control code block identified by an unused user-defined O code in ordered sets) into a downlink service flow, and if there is a unique identifiable code block in the service data flow, no additional code block needs to be inserted, where the unique identifiable code block is subsequently referred to as a first service code block, and the first service code block is used as a latency measurement point of a downlink service.

Step 503: The first node starts a downlink sending timer when obtaining the first service code block, and records a value of the downlink sending timer when sending a first downlink sending reference code block, where the recorded value may be referred to as a first downlink transmission time interval dtt(0).

Step 504: The second node starts a downlink receiving timer when receiving the first service code block, and records a value of the downlink receiving timer when sending a first downlink receiving reference code block, where the recorded value may be referred to as a second downlink receiving time interval drt(n+1).

Step 505: The second node inserts the second downlink receiving time interval drt(n+1) into a latency delivery OAM code block of an uplink service, to transmit the second downlink receiving time interval to the first node, and correspondingly, the first node receives the second downlink receiving time interval drt(n+1).

Step 506: The n intermediate nodes start downlink receiving timers when receiving the first service code block, and record values of the downlink receiving timers when receiving a third downlink receiving reference code block, where the value recorded by an $i^{th}$ intermediate node, in ascending order distances to the first node, may be referred to as a downlink receiving time interval drt(i).

Step 507: The n intermediate nodes further start downlink sending timers when receiving the first service code block, and record values of the downlink sending timers when sending a third downlink sending reference code block, where the value recorded by the $i^{th}$ intermediate node may be referred to as a downlink transmission time interval dtt(i).

Step 507: The n intermediate nodes insert downlink receiving time intervals and downlink transmission time intervals into a latency delivery OAM code block of the downlink service, to transmit the downlink receiving time intervals and the downlink transmission time intervals to the first node, and correspondingly, the first node receives the downlink receiving time intervals and the downlink transmission time intervals that are separately sent by the n intermediate nodes.

As shown in FIG. 6, if one intermediate node exists, a downlink latency T1=[dtt(0)+x0−drt(1)]+[dtt(1)+x1−drt(n+1)], where x0 is a latency of transmission of the reference code block between the first node and the intermediate node, and x1 is a latency of transmission of the reference code block between the intermediate node and the second node.

Step 508: In response to the asymmetric latency measurement command, the second node inserts a unique identifiable code block (for example, the control code block identified by the unused user-defined O code in the ordered sets) into an uplink service flow, and if there is a unique identifiable code block in the service data flow, no additional code block needs to be inserted, where the unique identifiable code block is subsequently referred to as a second service code block, and the second service code block is used as a latency measurement point of the uplink service.

Step 509: The second node starts an uplink sending timer when obtaining the second service code block, and records a value of the uplink sending timer when sending a second uplink sending reference code block, where the recorded value may be referred to as a first uplink transmission time interval utt(0).

Step 510: The second node inserts the first uplink transmission time interval utt(0) into the latency delivery OAM code block of the uplink service, to transmit the first uplink transmission time interval to the first node, and correspondingly, the first node receives the first uplink transmission time interval utt(0).

Step 511: The n intermediate nodes start uplink receiving timers when receiving the second service code block, and record values of the uplink receiving timers when receiving a fourth uplink receiving reference code block, where the value recorded by a $j^{th}$ intermediate node, in descending order of distances to the first node, may be referred to as an uplink receiving time interval urt(j).

Step 511: The n intermediate nodes start uplink sending timers when receiving the second service code block, and record values of the uplink sending timers when sending a fourth uplink sending reference code block, where the value recorded by the $j^{th}$ intermediate node may be referred to as an uplink transmission time interval utt(j).

Step 512: The n intermediate nodes insert uplink receiving time intervals and uplink transmission time intervals that are separately recorded by the n intermediate nodes into the latency delivery OAM code block of the uplink service, to transmit the uplink receiving time intervals and the uplink transmission time intervals to the first node, and correspondingly, the first node receives the uplink receiving time intervals and the uplink transmission time intervals that are sent by the n intermediate nodes.

As shown in FIG. 7, if one intermediate node exists, an uplink latency T2=[utt(0)+x0−urt(1)]+[utt(1)+x1−urt(n+1)], where x0 is a transmission latency of a reference code block between the first node and the intermediate node, and x1 is a transmission latency of the reference code block between the intermediate node and the second node.

Step 513: The first node starts an uplink receiving timer when receiving the second service code block, and records a value of the uplink receiving timer when receiving a second uplink receiving reference code block, where the recorded value may be referred to as a second uplink receiving time interval urt(n+1).

Step 514: The first node calculates the uplink and downlink latency difference ΔT between the first node and the second node according to the following formula:

$$\Delta T = T1 - T2 = DT - UT$$

$$DT = [dtt(0) - drt(1)] + [dtt(1) - drt(2)] + \ldots + [dtt(i) - drt(i+1)] + \ldots + [dtt(n) - drt(n+1)]$$

$$UT = [utt(0) - urt(1)] + [utt(1) - urt(2)] + \ldots + [utt(j) - urt(j+1)] + \ldots + [utt(n) - urt(n+1)]$$

Step 515: The first node performs asymmetric latency compensation on the uplink and downlink latency difference ΔT.

The following case may further exist in this embodiment of this application: None of the uplink transmission time intervals and the uplink receiving time intervals that are separately sent by the n intermediate nodes (if the N intermediate nodes exist), and the first uplink transmission time interval sent by the second node are transmitted to the first node, but are carried in the latency delivery OAM code block, or are all transmitted to a pre-specified network management server by using FlexE overheads. In addition, the first node also transmits the recorded first downlink transmission time interval and the second uplink receiving time interval to the network management server. Correspondingly, after obtaining the first downlink transmission time interval and the second uplink receiving time interval that are recorded by the first node, the first downlink receiving time interval and the first uplink transmission time interval that are recorded by the second node, and the uplink transmission time intervals and the uplink receiving time intervals that are separately sent by the n intermediate nodes (if the N intermediate nodes exist), the network management server calculates the first duration DT and the second duration UT according to the foregoing formulas for calculating the first duration DT and the second duration UT. Then, the network management server calculates the uplink and downlink latency difference between the first node and the second node based on the first duration DT and the second duration UT. A principle used by the network management server to determine the uplink and downlink latency difference between the first node and the second node is the same as a principle used by the first node to determine the uplink and downlink latency difference between the first node and the second node in step S303, and details are not described herein again.

The following case may further exist in this embodiment of this application: The n intermediate nodes separately send the uplink transmission time intervals and the uplink receiving time intervals (if the N intermediate nodes exist) to the second node, and the first node also sends the first downlink transmission time interval and the first uplink time interval to the second node. Correspondingly, after obtaining the first downlink transmission time interval and the second uplink receiving time interval that are recorded by the first node, and the uplink transmission time intervals and the uplink receiving time intervals that are separately sent by the n intermediate nodes (if the N intermediate nodes exist), the second node calculates the first duration DT and the second duration UT according to the foregoing formulas for calculating the first duration DT and the second duration UT. Then, the second node calculates the uplink and downlink latency difference between the first node and the second node based on the first duration DT and the second duration UT. A principle used by the second node to determine the uplink and downlink latency difference between the first node and the second node is the same as a principle used by the first node to determine the uplink and downlink latency difference between the first node and the second node in step S303, and details are not described herein again.

In the method described in FIG. 3, the first node determines the first duration based on a time interval between a time point of sending the first service code block on the first node and the time point of sending the first downlink sending reference code block on the first node, and the time interval between the time point of receiving the first service code block on the second node and the time point of receiving the first downlink receiving reference code block on the second node, determines the second duration based on a time interval between a time point of sending the second service code block on the second node and the time point of sending the second uplink sending reference code block on the second node, and the time interval between the time point of receiving the second service code block on the first node and the time point of receiving the second uplink receiving reference code block on the first node, and then determines the uplink and downlink latency difference between the first node and the second node based on the difference between the first duration and the second duration. This process does not need to depend on time synchronization performed by a GPS, so that stability is better and costs are lower.

The method in the embodiments of the present invention is described above in detail, and apparatuses in the embodiments of the present invention are provided below.

Figure 8:
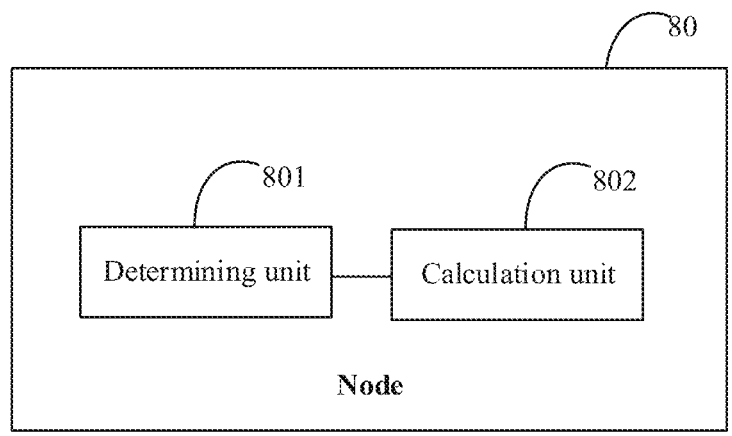
FIG. 8 is a schematic structural diagram of a node according to an embodiment of the present invention.

FIG. 8 is a schematic structural diagram of a node 80 according to an embodiment of the present invention. The node may include a determining unit 801 and a calculation unit 802. Each unit is described in detail below.

The determining unit 801 is configured to determine first duration based on a first downlink transmission time interval and a second downlink receiving time interval, where the first downlink transmission time interval is a time interval between a time point at which the node obtains a first service code block and a time point at which the node sends a first downlink sending reference code block, the second downlink receiving time interval is a time interval between a time point at which a second node receives the first service code block and a time point at which the second node receives a first downlink receiving reference code block, the first service code block is used to carry a service flow sent by the node to the second node, the first downlink sending reference code block is a code block used for downlink alignment when the node sends the first service code block, and the first downlink receiving reference code block is a code block used for downlink alignment when the second node receives the first service code block.

The determining unit 801 is further configured to determine second duration based on a first uplink transmission time interval and a second uplink receiving time interval, where the first uplink transmission time interval is a time interval between a time point at which the second node obtains a second service code block and a time point at which the second node sends a second uplink sending reference code block, the second uplink receiving time interval is a time interval between a time point at which the node receives the second service code block and a time point at which the node receives a second uplink receiving reference code block, the second service code block is used to carry a service flow sent by the second node to the node, the second uplink sending reference code block is a code block used for uplink alignment when the second node sends the second service code block, and the second uplink receiving reference code block is a code block used for uplink alignment when the node receives the second service code block.

The calculation unit 802 is configured to calculate an uplink and downlink latency difference between the node and the second node based on the first duration and the second duration.

By performing the foregoing steps, the node determines the first duration based on a time interval between a time point of sending the first service code block on the node and the time point of sending the first downlink sending reference code block on the node, and the time interval between the time point of receiving the first service code block on the second node and the time point of receiving the first downlink receiving reference code block on the second node, determines the second duration based on a time interval between a time point of sending the second service code block on the second node and the time point of sending the second uplink sending reference code block on the second node, and the time interval between the time point of receiving the second service code block on the node and the time point of receiving the second uplink receiving reference code block on the node, and then determines the uplink and downlink latency difference between the node and the second node based on a difference between the first duration and the second duration. This process does not need to depend on time synchronization performed by a GPS, so that stability is better and costs are lower.

In an optional solution, a communications link between the node and the second node does not pass through an intermediate node other than the node and the second node, or a communications link between the node and the second node is transparently transmitted through an intermediate node. The first duration, the first downlink transmission time interval, and the second downlink receiving time interval satisfy the following relationship: $DT = dtt(0) - drt(n+1)$, where DT is the first duration, $dtt(0)$ is the first downlink transmission time interval, and $drt(n+1)$ is the second downlink receiving time interval; and the second duration, the first uplink transmission time interval, and the second uplink receiving time interval satisfy the following relationship: $UT = utt(0) - urt(n+1)$, where UT is the second duration, $utt(0)$ is the first uplink transmission time interval, and $urt(n+1)$ is the second uplink receiving time interval.

In another optional solution, a communications link between the node and the second node passes through n intermediate nodes in non-transparent transmission mode, where n is a positive integer greater than or equal to 1, and in this case the first duration, the first downlink transmission time interval, and the second downlink receiving time interval satisfy the following relationship: $DT = [dtt(0) - drt(1)] + [dtt(1) - drt(2)] + \ldots + [dtt(i) - drt(i+1)] + \ldots + [dtt(n) - drt(n+1)]$, where DT is the first duration; $dtt(0)$ is the first downlink transmission time interval; $drt(n+1)$ is the second downlink receiving time interval; $drt(i)$ is a time interval between a time point at which an $i^{th}$ intermediate node in the n intermediate nodes receives the first service code block and a time point at which the $i^{th}$ intermediate node receives a third downlink receiving reference code block, and the third downlink receiving reference code block is a code block used for downlink alignment when the $i^{th}$ intermediate node receives the first service code block; and $dtt(i)$ is a time interval between the time point at which the $i^{th}$ intermediate node in the n intermediate nodes receives the first service code block and a time point at which the $i^{th}$ intermediate node sends a third downlink sending reference code block, and the third downlink sending reference code block is a code block used for downlink alignment when the $i^{th}$ intermediate node sends the first service code block, where $n \geq i \geq 1$; and the second duration, the first uplink transmission time interval, and the second uplink receiving time interval satisfy the following relationship: $UT = [utt(0) - urt(1)] + [utt(1) - urt(2)] + \ldots + [utt(j) - urt(j+1)] + \ldots + [utt(n) - urt(n+1)]$, where UT is the second duration; $utt(0)$ is the first uplink transmission time interval; $urt(n+1)$ is the second uplink receiving time interval; $urt(j)$ is a time interval between a time point at which a $j^{th}$ intermediate node in the n intermediate nodes receives the second service code block and a time point at which the $j^{th}$ intermediate node receives a fourth uplink receiving reference code block, and the fourth uplink receiving reference code block is a code block used for uplink alignment when the $j^{th}$ intermediate node receives the second service code block; and $utt(j)$ is a time interval between the time point at which the $j^{th}$ intermediate node in the n intermediate nodes receives the second service code block and a time point at which the $j^{th}$ intermediate node sends a fourth uplink sending reference code block, and the fourth uplink sending reference code block is a code block used for uplink alignment when the $j^{th}$ intermediate node sends the second service code block, where $n \geq j \geq 1$.

In still another optional solution, the node further includes a recording unit, a sending unit, and a receiving unit.

The recording unit is configured to record the first downlink transmission time interval $dtt(0)$ before the determining unit 801 determines the first duration based on the first downlink transmission time interval and the second downlink receiving time interval. The sending unit is configured to send first indication information to the second node and the n intermediate nodes, where the first indication information is used to indicate the first service code block, and the first service code block is used to instruct the second node and the intermediate nodes to record downlink receiving time intervals and downlink transmission time intervals. The receiving unit is configured to receive the downlink transmission time intervals and the downlink receiving time intervals that are separately sent by the n intermediate nodes, and the second downlink receiving time interval $drt(n+1)$ sent by the second node, where the downlink receiving time interval sent by the $i^{th}$ intermediate node is $drt(i)$, and the downlink transmission time interval sent by the $i^{th}$ intermediate node is $dtt(i)$.

In still another optional solution, the node further includes a recording unit, a sending unit, and a receiving unit. The receiving unit is configured to: before the determining unit 801 determines the first duration based on the first downlink transmission time interval and the second downlink receiving time interval, receive the first uplink transmission time interval utt(0) sent by the second node, and uplink receiving time intervals and uplink transmission time intervals that are separately sent by the n intermediate nodes, where the uplink receiving time interval sent by the $j^{th}$ intermediate node is urt(j), and the uplink transmission time interval sent by the $j^{th}$ intermediate node is utt(j). The receiving unit is configured to receive second indication information sent by the second node, where the second indication information is used to indicate the second service code block. The recording unit is configured to record the second uplink receiving time interval urt(n+1) according to the second indication information.

In still another optional solution, the uplink transmission time intervals and the uplink receiving time intervals that are separately sent by the n intermediate nodes, and the first uplink transmission time interval dtt(n+1) sent by the second node are carried in a latency delivery operation, administration, and maintenance OAM code block.

In still another optional solution, the downlink transmission time intervals and the downlink receiving time intervals that are separately sent by the n intermediate nodes, and the second downlink receiving time interval drt(n+1) sent by the second node are carried in the latency delivery OAM code block.

In still another optional solution, the first service code block is a frame header of a first service, and the second service code block is a frame header of a second service.

It should be noted that for implementation of each unit, refer to corresponding descriptions in the method embodiment shown in FIG. 3. The node 80 is the first node described in the method embodiment shown in FIG. 3.

In the node 80 described in FIG. 8, the node determines the first duration based on the time interval between the time point of sending the first service code block on the node and the time point of sending the first downlink sending reference code block on the node, and the time interval between the time point of receiving the first service code block on the second node and the time point of receiving the first downlink receiving reference code block on the second node, determines the second duration based on the time interval between the time point of sending the second service code block on the second node and the time point of sending the second uplink sending reference code block on the second node, and the time interval between the time point of receiving the second service code block on the node and the time point of receiving the second uplink receiving reference code block on the node, and then determines the uplink and downlink latency difference between the node and the second node based on a difference between the first duration and the second duration. This process does not need to depend on the GPS for time synchronization, so that the stability is better and the costs are lower.

Figure 9:
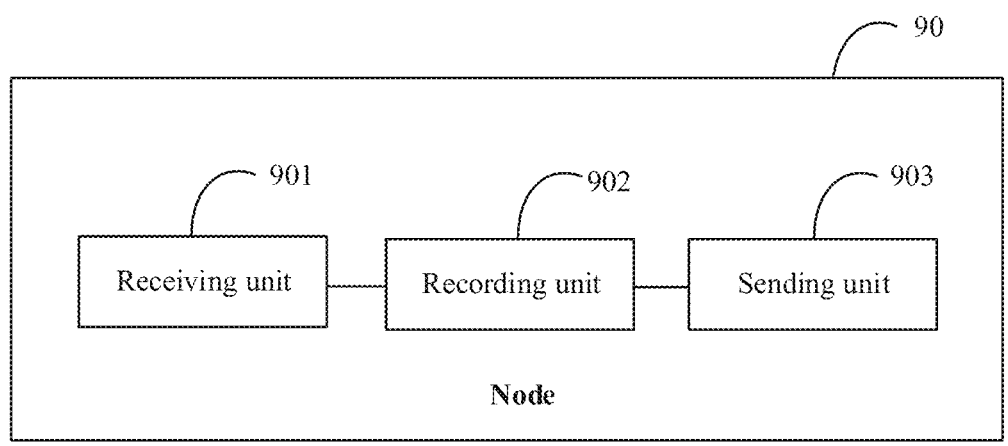
FIG. 9 is a schematic structural diagram of another node according to an embodiment of the present invention.

FIG. 9 is a schematic structural diagram of a node 90 according to an embodiment of the present invention. The node may include a receiving unit 901, a recording unit 902, and a sending unit 903. Each unit is described in detail below.

The receiving unit 901 is configured to receive first indication information sent by a first node, where the first indication information is used to indicate a first service code block.

The recording unit 902 is configured to record a second downlink receiving time interval according to the indication information, where the second downlink receiving time interval is a time interval between a time point at which the node receives the first service code block and a time point at which the node receives a first downlink receiving reference code block, the first service code block is used to carry a service flow sent by the first node to the node, and the first downlink receiving reference code block is a code block used for downlink alignment when the node receives the first service code block.

The sending unit 903 is configured to send the second downlink receiving time interval and a first uplink transmission time interval to the first node, where the first uplink transmission time interval is a time interval between a time point at which the node obtains a second service code block and a time point at which the node sends a second uplink sending reference code block, the first uplink transmission time interval and the second downlink receiving time interval are used to determine an uplink and downlink latency difference between the first node and the node, the second service code block is used to carry a service flow sent by the node to the first node, and the second uplink sending reference code block is a code block used for uplink alignment when the node sends the second service code block.

By performing the foregoing steps, the first node determines first duration based on a time interval between a time point of sending the first service code block on the first node and a time point of sending a first downlink sending reference code block on the first node, and the time interval between the time point of receiving the first service code block on the node and the time point of receiving the first downlink receiving reference code block on the node, determines second duration based on a time interval between a time point of sending the second service code block on the node and the time point of sending the second uplink sending reference code block on the node, and a time interval between a time point of receiving the second service code block on the first node and a time point of receiving a second uplink receiving reference code block on the first node, and then determines the uplink and downlink latency difference between the first node and the node based on a difference between the first duration and the second duration. This process does not need to depend on time synchronization performed by a GPS, so that stability is better and costs are lower.

In another optional solution, the sending unit is further configured to send second indication information to the first node, where the second indication information is used to indicate the second service code block, the second service code block is used to instruct the first node to determine a second uplink receiving time interval, the second uplink receiving time interval is the time interval between the time point at which the first node receives the second service code block and the time point at which the first node receives the second uplink receiving reference code block, and the second uplink receiving reference code block is a code block used for uplink alignment when the first node receives the second service code block.

In still another optional solution, the first service code block carries a frame header of a first service, and the second service code block carries a frame header of a second service.

It should be noted that for implementation of each unit, refer to corresponding descriptions in the method embodiment shown in FIG. 3. The node 90 is the second node described in the method embodiment shown in FIG. 3.

In the node 90 described in FIG. 9, the first node determines the first duration based on the time interval between the time point of sending the first service code block on the first node and the time point of sending the first downlink sending reference code block on the first node, and the time interval between the time point of receiving the first service code block on the node and the time point of receiving the first downlink receiving reference code block on the node, determines the second duration based on the time interval between the time point of sending the second service code block on the node and the time point of sending the second uplink sending reference code block on the node, and the time interval between the time point of receiving the second service code block on the first node and the time point of receiving the second uplink receiving reference code block on the first node, and then determines the uplink and downlink latency difference between the first node and the node based on the difference between the first duration and the second duration. This process does not need to depend on the GPS for time synchronization, so that the stability is better and the costs are lower.

Figure 10:
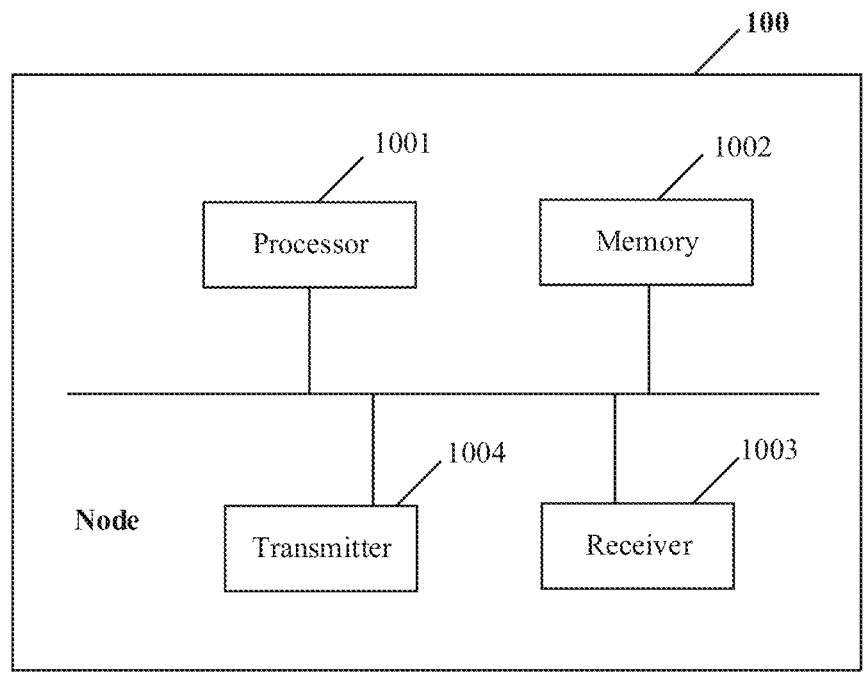
FIG. 10 is a schematic structural diagram of another node according to an embodiment of the present invention.

FIG. 10 shows a node 100 according to an embodiment of the present invention. The node includes a processor 1001, a memory 1002, a receiver 1003, and a transmitter 1004. The processor 1001, the memory 1002, the receiver 1003, and the transmitter 1004 are connected to each other by using a bus.

The memory 1002 includes, but is not limited to, a random access memory (random access memory, RAM), a read-only memory (read-only memory, ROM), an erasable programmable read-only memory (erasable programmable read only memory, EPROM), or a portable read-only memory (compact disc read-only memory, CD-ROM). The memory 1002 is configured to store a related instruction and related data. The receiver 1003 is configured to receive data, and the transmitter 1004 is configured to send data.

The processor 1001 may be one or more central processing units (central processing unit, CPU). When the processor 1001 is one CPU, the CPU may be a single-core CPU or a multi-core CPU.

The processor 1001 in the node is configured to read program code stored in the memory 1002, to perform the following operations:

determining first duration based on a first downlink transmission time interval and a second downlink receiving time interval, where the first downlink transmission time interval is a time interval between a time point at which the node obtains a first service code block and a time point at which the node sends a first downlink sending reference code block, the second downlink receiving time interval is a time interval between a time point at which a second node receives the first service code block and a time point at which the second node receives a first downlink receiving reference code block, the first service code block is used to carry a service flow sent by the node to the second node, the first downlink sending reference code block is a code block used for downlink alignment when the node sends the first service code block, and the first downlink receiving reference code block is a code block used for downlink alignment when the second node receives the first service code block;

determining second duration based on a first uplink transmission time interval and a second uplink receiving time interval, where the first uplink transmission time interval is a time interval between a time point at which the second node obtains a second service code block and a time point at which the second node sends a second uplink sending reference code block, the second uplink receiving time interval is a time interval between a time point at which the node receives the second service code block and a time point at which the node receives a second uplink receiving reference code block, the second service code block is used to carry a service flow sent by the second node to the node, the second uplink sending reference code block is a code block used for uplink alignment when the second node sends the second service code block, and the second uplink receiving reference code block is a code block used for uplink alignment when the node receives the second service code block; and calculating an uplink and downlink latency difference between the node and the second node based on the first duration and the second duration.

By performing the foregoing operations, the node determines the first duration based on a time interval between a time point of sending the first service code block on the node and the time point of sending the first downlink sending reference code block on the node, and the time interval between the time point of receiving the first service code block on the second node and the time point of receiving the first downlink receiving reference code block on the second node, determines the second duration based on a time interval between a time point of sending the second service code block on the second node and the time point of sending the second uplink sending reference code block on the second node, and the time interval between the time point of receiving the second service code block on the node and the time point of receiving the second uplink receiving reference code block on the node, and then determines the uplink and downlink latency difference between the node and the second node based on a difference between the first duration and the second duration, his process does not need to depend on time synchronization performed by a GPS, so that stability is better and costs are lower.

It should be noted that for implementation of each operation, refer to corresponding descriptions in the method embodiment shown in FIG. 3. The node 100 is the first node described in the method embodiment shown in FIG. 3.

Figure 11:
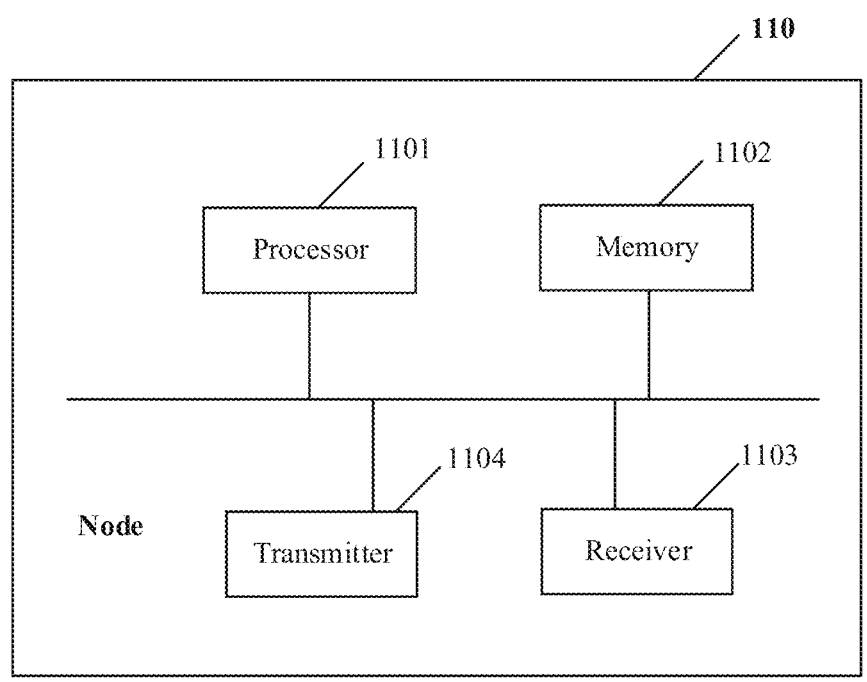
FIG. 11 is a schematic structural diagram of another node according to an embodiment of the present invention.

FIG. 11 shows a node 110 according to an embodiment of the present invention. The node may include a processor 1101, a memory 1102, a receiver 1103, and a transmitter 1104. The processor 1101, the memory 1102, the receiver 1103, and the transmitter 1104 are connected to each other by using a bus.

The memory 1102 includes, but is not limited to, a random access memory (random access memory, RAM), a read-only memory (read-only memory, ROM), an erasable programmable read-only memory (erasable programmable read only memory, EPROM), or a portable read-only memory (compact disc read-only memory, CD-ROM). The memory 1102 is configured to store a related instruction and related data. The receiver 1103 is configured to receive data, and the transmitter 1104 is configured to send data.

The processor 1101 may be one or more central processing units (central processing unit, CPU). When the processor 1101 is one CPU, the CPU may be a single-core CPU or a multi-core CPU.

The processor 1101 in the node is configured to read program code stored in the memory 1102, to perform the following operations:

receiving, by using the receiver, first indication information sent by a first node, where the first indication information is used to indicate a first service code block;

recording a second downlink receiving time interval according to the indication information, where the second downlink receiving time interval is a time interval between a time point at which the node receives the first service code block and a time point at which the node receives a first downlink receiving reference code block, the first service code block is used to carry a service flow sent by the first node to the node, and the first downlink receiving reference code block is a code block used for downlink alignment when the node receives the first service code block; and sending, by using the transmitter, the second downlink receiving time interval and a first uplink transmission time interval to the first node, where the first uplink transmission time interval is a time interval between a time point at which the node obtains a second service code block and a time point at which the node sends a second uplink sending reference code block, the first uplink transmission time interval and the second downlink receiving time interval are used to determine an uplink and downlink latency difference between the first node and the node, the second service code block is used to carry a service flow sent by the node to the first node, and the second uplink sending reference code block is a code block used for uplink alignment when the node sends the second service code block.

By performing the foregoing operations, the first node determines first duration based on a time interval between a time point of sending the first service code block on the first node and a time point of sending a first downlink sending reference code block on the first node, and the time interval between the time point of receiving the first service code block on the node and the time point of receiving the first downlink receiving reference code block on the node, determines second duration based on a time interval between a time point of sending the second service code block on the node and the time point of sending the second uplink sending reference code block on the node, and a time interval between a time point of receiving the second service code block on the first node and a time point of receiving a second uplink receiving reference code block on the first node, and then determines the uplink and downlink latency difference between the first node and the node based on a difference between the first duration and the second duration. This process does not need to depend on time synchronization performed by a GPS, so that stability is better and costs are lower.

It should be noted that for implementation of each operation, refer to corresponding descriptions in the method embodiment shown in FIG. 3. The node 110 is the second node described in the method embodiment shown in FIG. 3.

An embodiment of the present invention further provides a system chip. The system chip includes at least one processor, a memory, and an interface circuit, where the memory, the communications interface, and the at least one processor are connected to each other by using a line, the at least one memory stores an instruction, and when the instruction is executed by the processor, the method procedure shown in FIG. 3 is implemented.

An embodiment of the present invention further provides a computer-readable storage medium, where the computer-readable storage medium stores a program instruction, and when the program instruction is run on a processor, the method embodiment shown in FIG. 3 is implemented.

An embodiment of the present invention further provides a computer program product, where when the computer program product is run on a processor, the method embodiment shown in FIG. 3 is implemented.

In conclusion, according to the embodiments of the present invention, the first node determines the first duration based on the time interval between the time point of sending the first service code block on the first node and the time point of sending the first downlink sending reference code block on the first node, and the time interval between the time point of receiving the first service code block on the second node and the time point of receiving the first downlink receiving reference code block on the second node, determines the second duration based on the time interval between the time point of sending the second service code block on the second node and the time point of sending the second uplink sending reference code block on the second node, and the time interval between the time point of receiving the second service code block on the first node and the time point of receiving the second uplink receiving reference code block on the first node, and then determines the uplink and downlink latency difference between the first node and the second node based on the difference between the first duration and the second duration. This process does not need to depend on the time synchronization performed by the GPS, so that the stability is better and the costs are lower.

A person of ordinary skill in the art may understand that all or some of the procedures of the methods in the embodiments may be implemented by a computer program instructing related hardware. The program may be stored in a computer-readable storage medium, and when the program is executed, the procedures of the foregoing method embodiments may be included. The foregoing storage medium includes any medium that can store program code, such as a ROM, a random access memory RAM a magnetic disk, or an optical disc.

What is claimed is:

1. A flexible Ethernet latency measurement method, comprising:

determining, by a first node, first duration based on a first downlink transmission time interval and a second downlink receiving time interval, wherein the first downlink transmission time interval is a time interval between a time point at which the first node obtains a first service code block and a time point at which the first node sends a first downlink sending reference code block, the second downlink receiving time interval is a time interval between a time point at which a second node receives the first service code block and a time point at which the second node receives a first downlink receiving reference code block, the first service code block is used to carry a service flow sent by the first node to the second node, the first downlink sending reference code block is a code block used for downlink alignment when the first node sends the first service code block, and the first downlink receiving reference code block is a code block used for downlink alignment when the second node receives the first service code block;

determining, by the first node, second duration based on a first uplink transmission time interval and a second uplink receiving time interval, wherein the first uplink transmission time interval is a time interval between a time point at which the second node obtains a second service code block and a time point at which the second node sends a second uplink sending reference code block, the second uplink receiving time interval is a time interval between a time point at which the first node receives the second service code block and a time point at which the first node receives a second uplink receiving reference code block, the second service code block is used to carry a service flow sent by the second node to the first node, the second uplink sending reference code block is a code block used for uplink alignment when the second node sends the second service code block, and the second uplink receiving reference code block is a code block used for uplink alignment when the first node receives the second service code block; and calculating, by the first node, an uplink and downlink latency difference between the first node and the second node based on the first duration and the second duration.

2. The method according to claim 1, wherein a communications link between the first node and the second node does not pass through an intermediate node other than the first node and the second node, or a communications link between the first node and the second node is transparently transmitted through an intermediate node;

the first duration, the first downlink transmission time interval, and the second downlink receiving time interval satisfy the following relationship:

$$DT=dtt(0)-drt(n+1)$$

wherein DT is the first duration, dtt(0) is the first downlink transmission time interval, and drt(n+1) is the second downlink receiving time interval; and the second duration, the first uplink transmission time interval, and the second uplink receiving time interval satisfy the following relationship:

$$UT=utt(0)-urt(n+1)$$

wherein UT is the second duration, utt(0) is the first uplink transmission time interval, and urt(n+1) is the second uplink receiving time interval.

3. The method according to claim 1, wherein a communications link between the first node and the second node passes through n intermediate nodes in non-transparent transmission mode, wherein n is a positive integer greater than or equal to 1;

the first duration, the first downlink transmission time interval, and the second downlink receiving time interval satisfy the following relationship:

$$DT=[dtt(0)-drt(1)]+[dtt(1)-drt(2)]+\ldots+[dtt(i)-drt(i+1)]+\ldots+[dtt(n)-drt(n+1)]$$

wherein DT is the first duration; dtt(0) is the first downlink transmission time interval; drt(n+1) is the second downlink receiving time interval; drt(i) is a time interval between a time point at which an $i^{th}$ intermediate node in the n intermediate nodes receives the first service code block and a time point at which the $i^{th}$ intermediate node receives a third downlink receiving reference code block, and the third downlink receiving reference code block is a code block used for downlink alignment when the $i^{th}$ intermediate node receives the first service code block; and dtt(i) is a time interval between the time point at which the $i^{th}$ intermediate node in the n intermediate nodes receives the first service code block and a time point at which the $i^{th}$ intermediate node sends a third downlink sending reference code block, and the third downlink sending reference code block is a code block used for downlink alignment when the $i^{th}$ intermediate node sends the first service code block, wherein n≥i≥1; and the second duration, the first uplink transmission time interval, and the second uplink receiving time interval satisfy the following relationship:

$$UT=[utt(0)-urt(1)]+[utt(1)-urt(2)]+\ldots+[utt(j)-urt(j+1)]+\ldots+[utt(n)-urt(n+1)]$$

wherein UT is the second duration; utt(0) is the first uplink transmission time interval; urt(n+1) is the second uplink receiving time interval; urt(j) is a time interval between a time point at which a $j^{th}$ intermediate node in the n intermediate nodes receives the second service code block and a time point at which the $j^{th}$ intermediate node receives a fourth uplink receiving reference code block, and the fourth uplink receiving reference code block is a code block used for uplink alignment when the $j^{th}$ intermediate node receives the second service code block; and utt(j) is a time interval between the time point at which the $j^{th}$ intermediate node in the n intermediate nodes receives the second service code block and a time point at which the $j^{th}$ intermediate node sends a fourth uplink sending reference code block, and the fourth uplink sending reference code block is a code block used for uplink alignment when the $j^{th}$ intermediate node sends the second service code block, wherein n≥j≥1.

4. The method according to claim 3, wherein before the determining, by the first node, the first duration based on the first downlink transmission time interval and the second downlink receiving time interval, the method further comprises:

recording, by the first node, the first downlink transmission time interval dtt(0);

sending, by the first node, first indication information to the second node and the n intermediate nodes, wherein the first indication information is used to indicate the first service code block, and the first service code block is used to instruct the second node and the n intermediate nodes to record downlink receiving time intervals and downlink transmission time intervals; and receiving, by the first node, the downlink transmission time intervals and the downlink receiving time intervals that are separately sent by the n intermediate nodes, and the second downlink receiving time interval drt(n+1) sent by the second node, wherein the downlink receiving time interval sent by the $i^{th}$ intermediate node is drt(i), and the downlink transmission time interval sent by the $i^{th}$ intermediate node is dtt(i).

5. The method according to claim 3, wherein before the determining, by the first node, the first duration based on the first downlink transmission time interval and the second downlink receiving time interval, the method further comprises:

receiving, by the first node, the first uplink transmission time interval utt(0) sent by the second node, and uplink receiving time intervals and uplink transmission time intervals that are separately sent by the n intermediate nodes, wherein the uplink receiving time interval sent by the $j^{th}$ intermediate node is urt(j), and the uplink transmission time interval sent by the $j^{th}$ intermediate node is utt(j);

receiving, by the first node, second indication information sent by the second node, wherein the second indication information is used to indicate the second service code block; and recording, by the first node, the second uplink receiving time interval urt(n+1) according to the second indication information.

6. A flexible Ethernet latency measurement method, comprising:

receiving, by a second node, first indication information sent by a first node, wherein the first indication information is used to indicate a first service code block;

recording, by the second node, a second downlink receiving time interval according to the first indication information, wherein the second downlink receiving time interval is a time interval between a time point at which the second node receives the first service code block and a time point at which the second node receives a first downlink receiving reference code block, the first service code block is used to carry a service flow sent by the first node to the second node, and the first downlink receiving reference code block is a code block used for downlink alignment when the second node receives the first service code block; and sending, by the second node, the second downlink receiving time interval and a first uplink transmission time interval to the first node, wherein the first uplink transmission time interval is a time interval between a time point at which the second node obtains a second service code block and a time point at which the second node sends a second uplink sending reference code block, the first uplink transmission time interval and the second downlink receiving time interval are used to determine an uplink and downlink latency difference between the first node and the second node, the second service code block is used to carry a service flow sent by the second node to the first node, and the second uplink sending reference code block is a code block used for uplink alignment when the second node sends the second service code block.

7. The method according to claim 6, wherein the method further comprises:

sending, by the second node, second indication information to the first node, wherein the second indication information is used to indicate the second service code block, the second service code block is used to instruct the first node to determine a second uplink receiving time interval, the second uplink receiving time interval is a time interval between a time point at which the first node receives the second service code block and a time point at which the first node receives a second uplink receiving reference code block, and the second uplink receiving reference code block is a code block used for uplink alignment when the first node receives the second service code block.

8. A node, wherein the node comprises a processor and a memory, the memory is configured to store a program instruction, and the processor is configured to invoke the program instruction to perform the following operations:

determining first duration based on a first downlink transmission time interval and a second downlink receiving time interval, wherein the first downlink transmission time interval is a time interval between a time point at which the node obtains a first service code block and a time point at which the node sends a first downlink sending reference code block, the second downlink receiving time interval is a time interval between a time point at which a second node receives the first service code block and a time point at which the second node receives a first downlink receiving reference code block, the first service code block is used to carry a service flow sent by the node to the second node, the first downlink sending reference code block is a code block used for downlink alignment when the node sends the first service code block, and the first downlink receiving reference code block is a code block used for downlink alignment when the second node receives the first service code block;

determining second duration based on a first uplink transmission time interval and a second uplink receiving time interval, wherein the first uplink transmission time interval is a time interval between a time point at which the second node obtains a second service code block and a time point at which the second node sends a second uplink sending reference code block, the second uplink receiving time interval is a time interval between a time point at which the node receives the second service code block and a time point at which the node receives a second uplink receiving reference code block, the second service code block is used to carry a service flow sent by the second node to the node, the second uplink sending reference code block is a code block used for uplink alignment when the second node sends the second service code block, and the second uplink receiving reference code block is a code block used for uplink alignment when the node receives the second service code block; and calculating an uplink and downlink latency difference between the node and the second node based on the first duration and the second duration.

9. The node according to claim 8, wherein a communications link between the node and the second node does not pass through an intermediate node other than the node and the second node, or a communications link between the node and the second node is transparently transmitted through an intermediate node;

the first duration, the first downlink transmission time interval, and the second downlink receiving time interval satisfy the following relationship:

$$DT=dtt(0)-drt(n+1)$$

wherein DT is the first duration, $dtt(0)$ is the first downlink transmission time interval, and $drt(n+1)$ is the second downlink receiving time interval; and the second duration, the first uplink transmission time interval, and the second uplink receiving time interval satisfy the following relationship:

$$UT=utt(0)-urt(n+1)$$

wherein UT is the second duration, $utt(0)$ is the first uplink transmission time interval, and $urt(n+1)$ is the second uplink receiving time interval.

10. The node according to claim 8, wherein a communications link between the node and the second node passes through n intermediate nodes in non-transparent transmission mode, wherein n is a positive integer greater than or equal to 1;

the first duration, the first downlink transmission time interval, and the second downlink receiving time interval satisfy the following relationship:

$$DT=[dtt(0)-drt(1)]+[dtt(1)-drt(2)]+\ldots+[dtt(i)-drt(i+1)]+\ldots+[dtt(n)-drt(n+1)]$$

wherein DT is the first duration; $dtt(0)$ is the first downlink transmission time interval; $drt(n+1)$ is the second downlink receiving time interval; $drt(i)$ is a time interval between a time point at which an $i^{th}$ intermediate node in the n intermediate nodes receives the first service code block and a time point at which the $i^{th}$ intermediate node receives a third downlink receiving reference code block, and the third downlink receiving reference code block is a code block used for downlink alignment when the $i^{th}$ intermediate node receives the first service code block; and $dtt(i)$ is a time interval between the time point at which the $i^{th}$ intermediate node in the n intermediate nodes receives the first service code block and a time point at which the $i^{th}$ intermediate node sends a third downlink sending reference code block, and the third downlink sending reference code block is a code block used for downlink alignment when the $i^{th}$ intermediate node sends the first service code block, wherein $n \geq i \geq 1$; and the second duration, the first uplink transmission time interval, and the second uplink receiving time interval satisfy the following relationship:

$$UT=[utt(0)-urt(1)]+[utt(1)-urt(2)]+ \ldots +[utt(j)-urt(j+1)]+ \ldots +[utt(n)-urt(n+1)]$$

wherein UT is the second duration; utt(0) is the first uplink transmission time interval; urt(n+1) is the second uplink receiving time interval; urt(j) is a time interval between a time point at which a $j^{th}$ intermediate node in the n intermediate nodes receives the second service code block and a time point at which the $j^{th}$ intermediate node receives a fourth uplink receiving reference code block, and the fourth uplink receiving reference code block is a code block used for uplink alignment when the $j^{th}$ intermediate node receives the second service code block; and utt(j) is a time interval between the time point at which the $j^{th}$ intermediate node in the n intermediate nodes receives the second service code block and a time point at which the $j^{th}$ intermediate node sends a fourth uplink sending reference code block, and the fourth uplink sending reference code block is a code block used for uplink alignment when the $j^{th}$ intermediate node sends the second service code block, wherein n≥j≥1.

11. The node according to claim 10, wherein the node further comprises a receiver and a transmitter; and before determining the first duration based on the first downlink transmission time interval and the second downlink receiving time interval, the processor is further configured to:

record the first downlink transmission time interval dtt(0);

send first indication information to the second node and the n intermediate nodes by using the transmitter, wherein the first indication information is used to indicate the first service code block, and the first service code block is used to instruct the second node and the n intermediate nodes to record downlink receiving time intervals and downlink transmission time intervals; and receive, by using the receiver, the downlink transmission time intervals and the downlink receiving time intervals that are separately sent by the n intermediate nodes, and the second downlink receiving time interval drt(n+1) sent by the second node, wherein the downlink receiving time interval sent by the $i^{th}$ intermediate node is drt(i), and the downlink transmission time interval sent by the $i^{th}$ intermediate node is dtt(i).

12. The node according to claim 10, wherein the node further comprises a receiver; and before determining the first duration based on the first downlink transmission time interval and the second downlink receiving time interval, the processor is further configured to:

receive, by using the receiver, the first uplink transmission time interval utt(0) sent by the second node, and uplink receiving time intervals and uplink transmission time intervals that are separately sent by the n intermediate nodes, wherein the uplink receiving time interval sent by the $j^{th}$ intermediate node is urt(j), and the uplink transmission time interval sent by the $j^{th}$ intermediate node is utt(j);

receive, by using the receiver, second indication information sent by the second node, wherein the second indication information is used to indicate the second service code block; and record the second uplink receiving time interval urt(n+1) according to the second indication information.

* * * * *